US008175930B2

(12) United States Patent
Ourega

(10) Patent No.: US 8,175,930 B2
(45) Date of Patent: May 8, 2012

(54) APPARATUS FOR SELLING SHIPPING SERVICES THROUGH A MEDIATOR'S WEB SITE

(75) Inventor: Jean Dobey Ourega, Verdun (CA)

(73) Assignee: Shopmedia Inc., Montreal (CA)

( * ) Notice: Subject to any disclaimer, the term of this patent is extended or adjusted under 35 U.S.C. 154(b) by 1208 days.

(21) Appl. No.: 11/816,491

(22) PCT Filed: Feb. 16, 2006

(86) PCT No.: PCT/CA2006/000224
§ 371 (c)(1),
(2), (4) Date: Aug. 16, 2007

(87) PCT Pub. No.: WO2006/086877
PCT Pub. Date: Aug. 24, 2006

(65) Prior Publication Data
US 2008/0162304 A1    Jul. 3, 2008

Related U.S. Application Data

(60) Provisional application No. 60/653,486, filed on Feb. 17, 2005.

(51) Int. Cl.
*G01C 21/00* (2006.01)
(52) U.S. Cl. ...................................... 705/26.1
(58) Field of Classification Search .................. 705/26.1
See application file for complete search history.

(56) References Cited

U.S. PATENT DOCUMENTS

| 5,631,827 | A  | 5/1997 | Nicholls et al. |
| 6,219,653 | B1 | 4/2001 | O'Neill et al.  |
| 6,862,572 | B1 | 3/2005 | de Sylva        |
| 6,915,268 | B2 | 7/2005 | Riggs et al.    |
| 6,920,429 | B1 | 7/2005 | Barni et al.    |
| 7,711,650 | B1 * | 5/2010 | Kara ............................... 705/60 |

(Continued)

FOREIGN PATENT DOCUMENTS

JP     2002-49777     2/2002
(Continued)

OTHER PUBLICATIONS

Overseas shipping options, Mark Del Franco; Catalog Age. New Canaan: Aug. 2003. vol. 20, Iss. 9; p. 37; http://proquest.umi.com/pqdweb?did=387023751&sid=2&Fmt=4&clientId=19649&RQT=309&VName=PQD.*

*Primary Examiner* — Mila Airapetian
(74) *Attorney, Agent, or Firm* — Gowlings

(57) ABSTRACT

The present invention relates to a computer program product for providing a system for selling shipping services online. The system comprises data recording medium, product selector, shipping service information collector, shipping parameter collector, shipping option computing module, shipping service selector, shipping service notifying module and transaction concluding module. The product selector is for selecting a product by a buyer. The shipping service information collector is for obtaining information about shipping services from carriers. The shipping parameter collector is for obtaining information to specify shipping parameters. The shipping option computing module is for computing available shipping services. The shipping service selector is for selecting a shipping service related to a given carrier. The shipping service notifying module is for generating a shipping service request and transmitting the request to the carrier. The transaction concluding module is for receiving a response to the request and transmitting the response to the buyer.

21 Claims, 27 Drawing Sheets

U.S. PATENT DOCUMENTS

| | | |
|---|---|---|
| 2002/0032573 A1 | 3/2002 | Williams et al. |
| 2002/0095347 A1 | 7/2002 | Cummiskey |
| 2002/0133414 A1 | 9/2002 | Pradhan et al. |
| 2003/0217018 A1* | 11/2003 | Groff et al. ................... 705/404 |
| 2004/0260615 A1 | 12/2004 | Phillips et al. |
| 2005/0060235 A2 | 3/2005 | Byrne |
| 2005/0071244 A1 | 3/2005 | Phillips et al. |

FOREIGN PATENT DOCUMENTS

| | | |
|---|---|---|
| WO | WO01/90845 | 11/2001 |
| WO | WO02/17194 | 2/2002 |
| WO | WO02/075632 | 9/2002 |

* cited by examiner

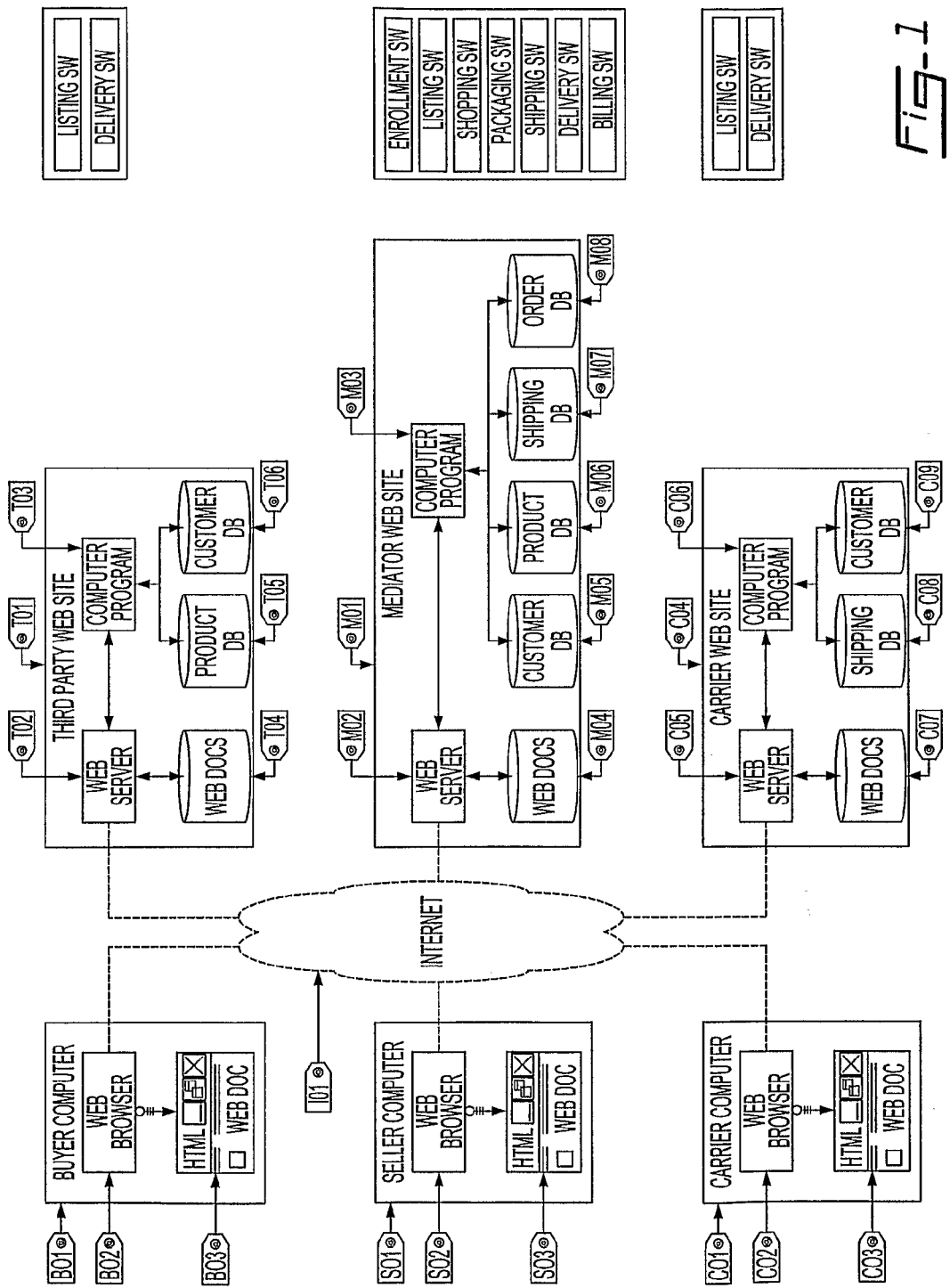

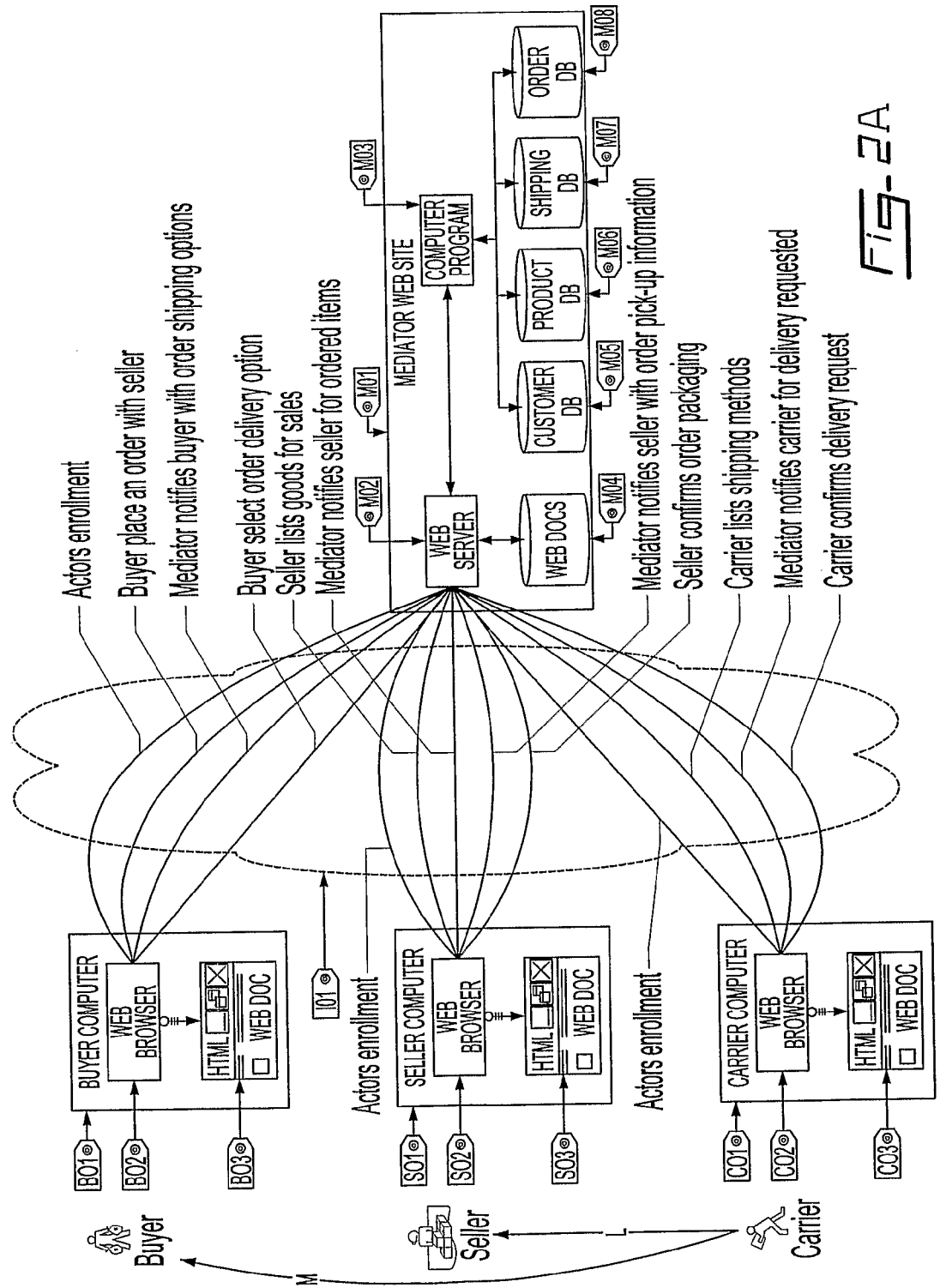

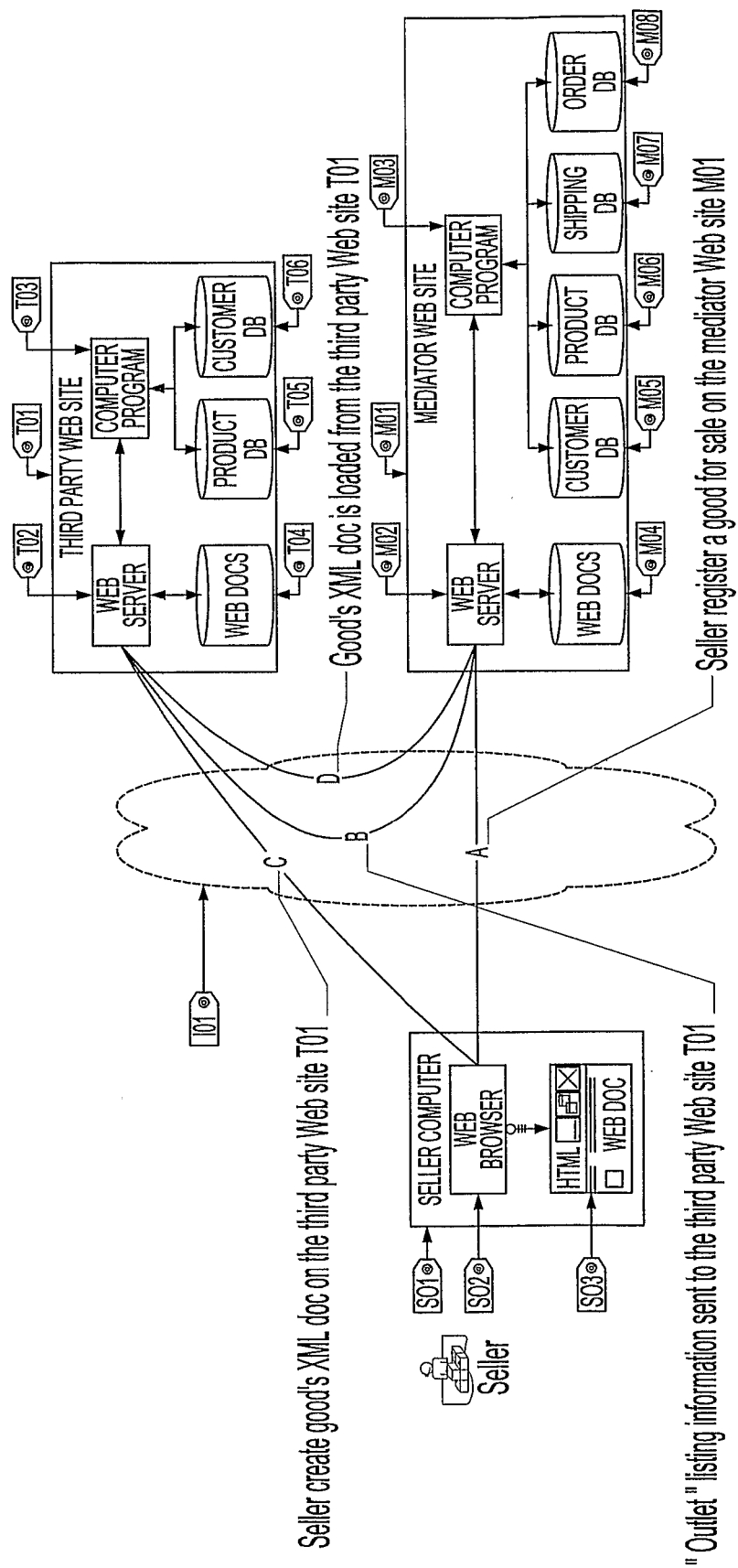

Fig-7B

ShopMedia.com - Services - Checkout - Microsoft Internet Explorer

Address: http://www.shopmedia.com/smapi/op/checkout

ShopMedia™ Services | CHECKOUT home | sign out | desktop | services | help?

① Select items | ② Edit recipient | ③ Confirm checkout

Please select your winning items you want to checkout now.

[Cancel!] [Merge items!] [Checkout Now!]

COMICAGE™
Items from seller: RealDeal

| | CHANNEL - ID | ITEM NAME | PRICE | QTTY | DATE ENDE |
|---|---|---|---|---|---|
| ☒ | C-2401680300 | NFL FEVER 2002 XBOX * NO RESERVE AUCTION! (Relisted) | $25.00 | 1 | AUG/06/2004 | eBay™
Items from seller: Panasonic.com

| | CHANNEL - ID | ITEM NAME | PRICE | QTTY | DATE ENDE |
|---|---|---|---|---|---|
| ☒ | A-2401680640 | abcde | $1.00 | 1 | AUG/06/2004 |

Cnet Auctions
Items from seller: Panasonic.com

| | CHANNEL - ID | ITEM NAME | PRICE | QTTY | DATE ENDE |
|---|---|---|---|---|---|
| ☒ | E-2401680381 | ABCD Relisted | $54.00 | 2 | AUG/06/2004 |

Trusted sites

Fig-7C

ShopMedia.com - Services - Checkout - Microsoft Internet Explorer

File  Edit  View  Favorites  Tools  Help

Back  ▸  ⊗  ▸  ⊠  ⚹  ⌂  | ⌕ Search  ☆ Favorites  ⏻ Media  ⊚  | ⌘  ⊠  ⌕  ▸

Address  http://www.shopmedia.com/smapi/op/checkout  ▾  → Go links  Shopmedia  ⊞ ⌘PLESK  ⊞ Railbow  ▷ Comicage  ⊙ ⌘Business  ⌕ Google  ⊗ Hotmail  ⊞ eBay  ⌘ Amazon  ⊞ yahoo!  ⊞ Java  ⊞ www.un.org  ⌘ Abidjan.net  »

ShopMedia™ Services  [ CHECKOUT  ④ ]  home | sign out | desktop | services | help?

① Select items | ② Edit recipient | ③ Confirm checkout

Please edit your package(s) recipient/shipping information.

[ <<Back ]  [ Cancel ]

| CHECKOUT/SELLER/ITEMS | | SHIP TO / RECIPIENT |
|---|---|---|
| YAHOO! Auctions<br>Items from seller: Panasonic.com<br>Checkout items > [click to view selection] ▷ | | Jean-Dobey Ourega Enid<br>3064 Jacques-Lauzon<br>Verdum (Quebec)<br>CANADA H4G 3M8<br>Change / Edit this recipient? |
| amazon.com.<br>Items from seller: jennystores.com<br>Checkout items > [click to view selection] ▷ | | Georges Hallak<br>104 Francois-Audet<br>Montreal (Quebec)<br>CANADA H2N 2Z6<br>Change / Edit this recipient? |
| COMICAGE™<br>Items from seller: jennystores.com<br>Checkout items > [click to view selection] ▷ | | Edit / Select Recipient >> | e∫ay™

⊚ Trusted sites

Fig. 8

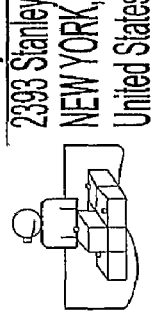
Fig-8 (continue)

Sales Manager

Home | Ongoing | Sold | Unsold | Payment | Packaging | Shipping | Refund | Customers Sales > Shipping > Services Auctions Please choose a shipping service for package (CNET1001806)

SHIPPING CENTER - CNET1001806

Parcel from: Jean-Dobey Ourega
3064 Jacque-Lauzon
Verdun (Quebec)
CANADA H4G 3M8

Delivery to: Charles Jevinsky
New York (New York)
USA NY11020

Total billed: USD 504.90 (USD = US Dollar)

Declare at: 504.90 | USD Dollar

Preferences: Deliver anytime - afternoon & morning

Submit >>  Exit >>   Quick help

| | AVAILABLE SERVICE | COMPANY | EST/COST | EST/ARRIVAL |
|---|---|---|---|---|
| ○ | FedEx@Ground | FedEx | USD 40.00 | JAN-24-2005 |
| ○ | FedEx@International Economy | FedEx | USD 5.00 | JAN-20-2005 |
| ○ | FedEx@International Priority | FedEx | USD 44.00 | JAN-21-2005 |
| ○ | FedEx@International Priority Worldwide | FedEx | USD 23.00 | JAN-24-2005 |
| ○ | FedEx@International Overnight | FedEx | USD 9.00 | JAN-20-2005 |
| ○ | Air Parcels Canada Post | Canada Post | USD 27.00 | JAN-23-2005 |
| ○ | Air Parcels Canada Post | Canada Post | USD 26.00 | JAN-23-2005 |
| ○ | Puro Delivery Overnight | Canada Post | USD 36.00 | JAN-23-2005 |
| ○ | Regular Parcel Canada Post | Canada Post | USD 26.00 | JAN-21-2005 |
| ○ | Surface Parcels Canada Post | Canada Post | USD 24.00 | JAN-22-2005 |

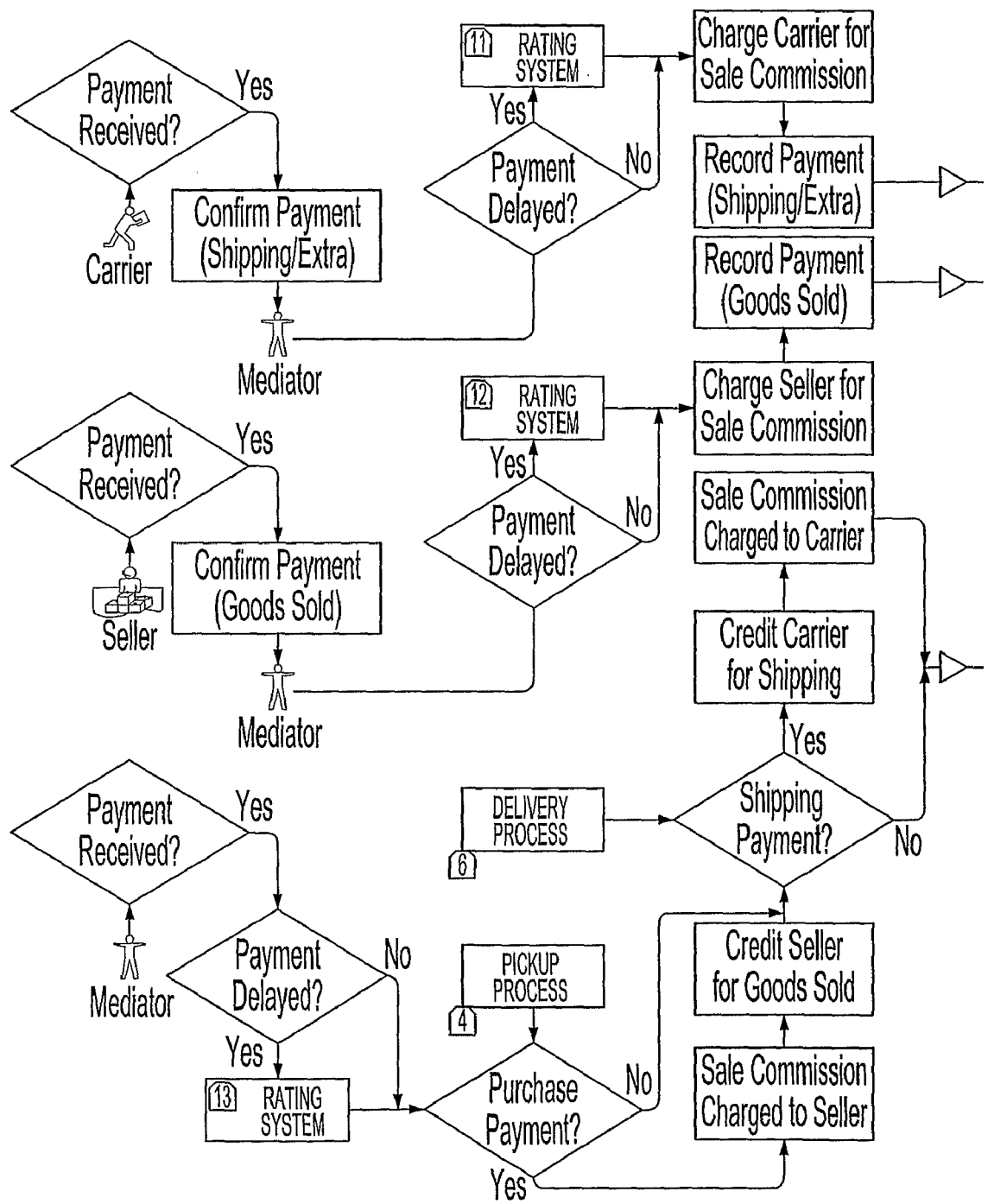
Fig-13A (continue)

Fig-13B

Sales Manager

Home | Ongoing | Sold | Unsold | × Payment | Packaging
▷ Sales > Payment > Confirmation
(cnet) Auctions Please edit and submit payment transaction for package (CNET1002106)!

| PAYMENT CONFIRMATION - CNET1002106 | |
|---|---|
| Overdue Balance: | USD 75.18 (Converter?) |
| Payment deadline: | May-03-2004 |
| Payment Currency: | US Dollar ▽ USD |
| Current Payment: | 75.18 USD |
| Payment Method: | Select method ▽ |
| Content Billed: | Purchase ▽ |
| Transax Author: | Seller ▽ |
| Date of Payment: | 18 ▽ JAN ▽ 2005 ▽ |

[Update!] [Details >>] [Exit >>] Quick help

| CONTENT | SUBMITTED | AMOUNT | PAYMENT | AUTHOR | STATUS |
|---|---|---|---|---|---|
| Purchase | JAN-18-2005 | USD 450.00 | Visa | Buyer | Pending |
| Purchase | JAN-18-2005 | USD 108.85 | reward | Seller | Pending |
| Shipping | JAN-18-2005 | USD 24.82 | Undefined | ShopMedia | Pending |
| Purchase | JAN-17-2005 | USD 250.00 | PayPal | Seller | Pending |

ShopMedia

The Interactive Online Marketplace
Home > Services > E-Rating > Member Rating

Trading Scores: Jdobey_enidson

| Transaction type | Completed | Declined | Total | Rating |
|---|---|---|---|---|
| Items checkout | 4 | 0 | 4 | 100% |
| Order payment | 10 | 3 | 13 | 95% |
| Packaging | 30 | 0 | 30 | 100% |
| Shipping & Delivery | 17 | 1 | 18 | 76% |
| Refund & Credits | 1 | 0 | 1 | 100% |

Member profile summary

| | |
|---|---|
| Merchant ID & Organization: | GAP.COM/USA (827) GAP Group Inc. |
| Member since: | Friday, Sep 17, 1999 |
| Seller location: | San fransico United States /California |
| Overall rating: | 83% (2304 transactions) |

Fig. 14B

| Checkout | Payment | Packaging | Shipping | Refund | Others | | All ▾ | Browse |

These are the packaging scores from ShopMedia Transaction Rating

| Package Code | Packaging | Delayed | Score | Buyer ID |
|---|---|---|---|---|
| UBID1002108 | MAY-03-2003 | NO | 1 | k1mulroney (93) |
| CNET1002106 | FEB-12-2004 | NO | 1 | antico2 (117) |
| EBAY1002204 | MAR-30-2004 | NO | 1 | cybercove (16) |

30 transactions

Fig-14B (continue)

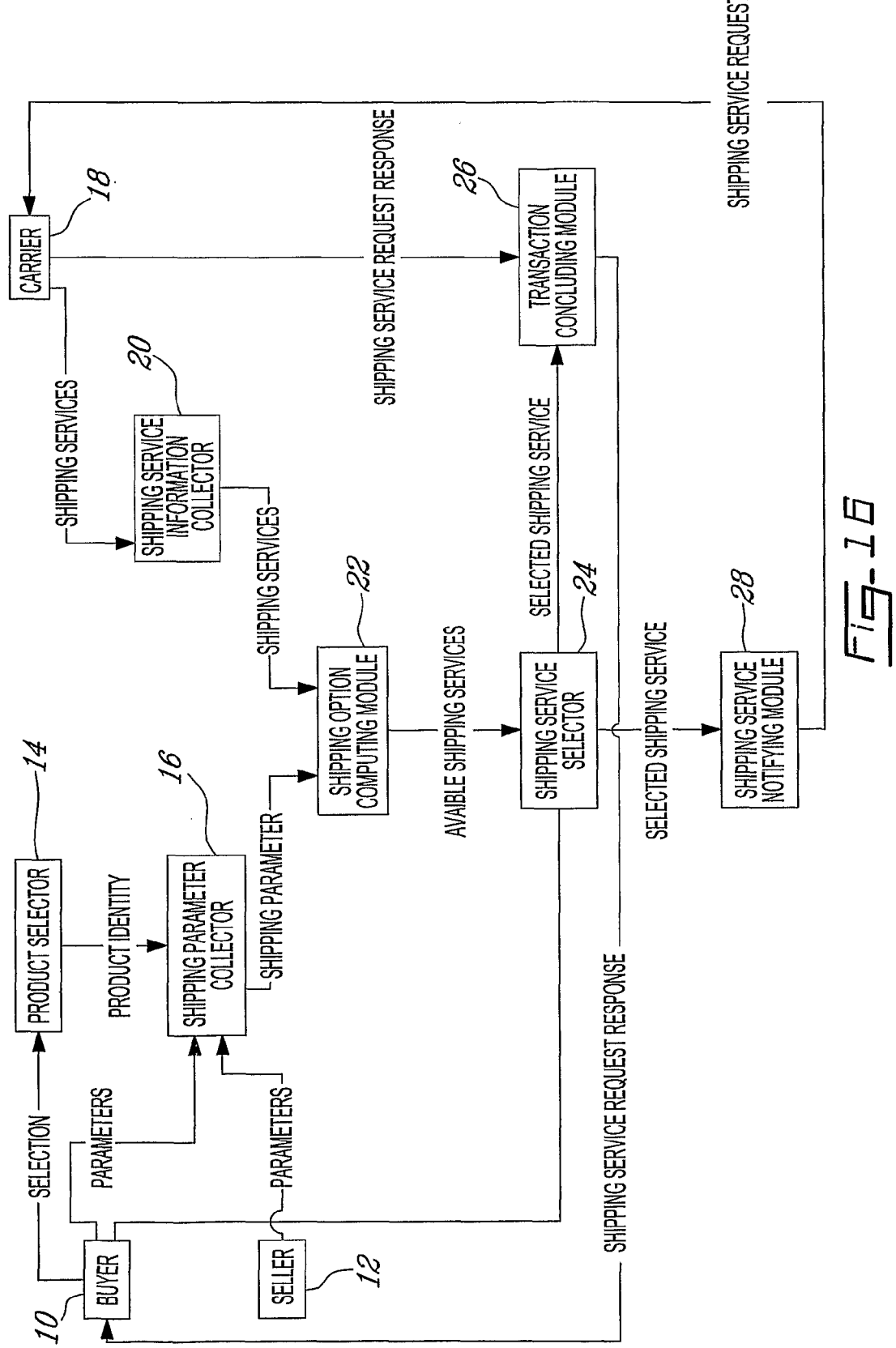

APPARATUS FOR SELLING SHIPPING SERVICES THROUGH A MEDIATOR'S WEB SITE

FIELD OF THE INVENTION

This invention relates to the field of electronic commerce and more particularly to a method and an apparatus of selling shipping services online through a mediator's Web site.

BACKGROUND OF THE INVENTION

The electronic commerce emerged in the mid-1990s as commercial transactions over the Internet. This includes buying and selling of goods and services through business-to-consumer (B2C), business-to-business (B2B), and consumer-to-consumer (C2C) markets. However, the electronic commerce also includes the exchange of information not related to the buying and selling of goods.

As the electronic commerce involves, the Internet has become an overwhelming tool for consumers to search and purchase goods and services using Internet-based systems. The popularity of the electronic commerce is due not only to the fact that the Internet provides online shoppers with conveniences and choices, but because this technology has also rendered the seller's location less an issue. However, the goods purchased on the Internet, are delivered in the physical world. Thus, shipping companies, which are in charge of conveying these goods from the seller to the buyer, are vital in online retail sales.

While technology has allowed shipping companies to reduce operating expenses, their success still depends a great deal of economical factors related to the physical world. For example, the shipping freights associated to the delivery of a potential parcel are based on the locations of the seller and buyer, among other factors. Thus, regardless the way technology enables goods to be traded on the Internet, various factors in the physical world, where parcels are conveyed, continue to impact the shipping charges associated to delivering the goods purchased on the Internet.

As it is known in online retail sales, the carrier approaches the buyer via the seller of goods, as the middleman. Sellers provide the shipping options and charges associated to the delivery of orders placed with them. On the other hand, carriers compete through discounted shipping rates that are offered to the sellers of goods, as a marketing incentive to handle their delivery volume. These practices are common on Web-based (and offline) retail and are the source of many problems and concerns among the online trading community.

Indeed, as the popularity of the electronic commerce increases, shoppers become more experienced, discerning, selective, and demanding. While Web-based systems enable buyers and sellers to trade goods on the Internet, the shipping charges associated to the delivery of these goods drive the majority of online shoppers to abandon their shopping cart after seeing these charges.

Although many merchants use new technologies (such as shipping calculator) to help online shoppers estimate shipping freights on their Web sites, in many cases they lack the resources needed to provide accurate shipping charges. As the Internet has transcended geographic barriers, a seller who targets a global market, must design a system capable of handling local and foreign shipping requirements, such as custom and duty charges in foreign countries. These requirements add to the overhead associated to selling on the Internet, including marketing goods to consumers and keeping them as customers. While such a system can be very expensive to design and maintain for the average seller, many merchants are not equipped enough to set up and/or maintain these operations.

Since the seller provides the shipping options associated to the delivery of the orders placed with him, many merchants use the delivery charges as a profit center by overcharging their customers. Online merchants also use discounted shipping rates offered by some shipping companies for further profit, by charging the full shipping price to their customers. Hence, online consumers suspect that the shipping and handling costs they're asked to pay are sometimes unreasonable, while other shoppers believe they're being gouged for further profit on shipping costs. As a result, the majority of online shoppers regularly abandon their shopping cart before completing their orders, which translates to a lost in sale for online merchants. The most common causes of shopping cart abandonment are attributed to expensive shipping charges and lengthy delivery, while the majority of these consumers blame unreasonable shipping charges.

Although online merchants ought to use shipping calculators to provide accurate shipping costs on their sites, online shoppers are still concerned about being gauged for profit on these charges. Hence, some shoppers allay their fears by shopping only online merchants located in their area, to reduce the shipping freights associated to their online purchases. Other consumers use Internet search engines to find goods they intend to purchase offline. More specifically, these consumers search the Internet to find a merchant located in their geographic areas to purchase the desired good in a physical store. This way, they avoid paying for extra shipping and handling charges that might be associated to delivering the same purchase, if it was placed on the Internet with the same local merchant. As a result, local commercial search, e.g., those online consumers seeking merchants located in their areas, accounts for a significant portion of all Internet searches.

The shipping charges also contribute to make light goods (such as books, music & DVD, clothes, etc.) more popular among online shoppers because of relatively low delivery costs, while online shoppers use the Internet to find heavy goods they intend to purchase in a physical store. As a matter of fact, online shoppers say free delivery and handling are most likely to encourage their online purchases, and others prefer free shipping as marketing promotion. As a result, online merchants use periodic free shipping campaigns to hold on to more online consumers. However, most online merchants do offer free shipping for light products that are less expensive to ship.

On the other hand, since shipping companies approach the online shoppers through the merchants, the competition for the Internet market between these firms is essentially based on the discounted delivery rates given to online merchants. Thus, the delivery firms that cannot afford such discounts to merchants, because of limited resources, abandon the business opportunity generated by the Internet economy. For example, a small delivery firm can't compete against a large corporation that is best positioned to offer discounted shipping rates to online merchants, in their marketing strategies. This situation renders the shipping market less competitive, which is not advantageous for consumers. In addition, because shipping companies deal with online merchants and not openly with shoppers, their online marketing initiatives depend a great deal on the merchant's ability to deal with the issue of shopping cart abandonment, that impact on the portion of the shipping volume originating from online purchases.

Although the electronic commerce includes various systems tailored to enable buyers to trade goods and services on the Internet, none of these business models adequately deal with the issues discusses above.

Traditionally, there has been no acceptable way to enable buyers to openly select the shipping options for the delivery of their orders from independent carriers, which ensures fair, competitive (yet accurate) shipping charges, while eliminating the extra shipping freights charged by sellers, reassuring buyers about the accuracy of the shipping charges associated to the delivery of their orders, and minimizing the burden for sellers to providing the delivery options of the orders placed with them.

In addition, there has been no acceptable way to enable carriers to bypass sellers, and then openly compete for the shipping volume originated from Internet purchases made by buyers, which will ensure a fair competition among delivery firms since this alternative will eliminate the need for carriers to offer discounted shipping rates to sellers.

SUMMARY OF THE INVENTION

It is therefore an object of the present invention to provide methods and apparatus of concluding on-line transactions that overcome the above drawbacks.

The invention enables buyers to openly select delivery methods of goods purchased online, from independent carriers. In this sense it removes direct control of the order shipping options and charges from the seller of goods. Also, the invention enables carriers to bypass sellers and openly do business with buyers on goods. In this approach, it ensures a fair competition among shipping companies for the shipping volume originated from any goods purchased on the Internet.

The invention enables sellers, buyers, and shipping companies to exchange goods, services and communications, using a system provided by a third entity, referred to herein as the "mediator", in return for a commission. The mediator may facilitate these transactions by using any communication tools such as a telephone, brochure, or mail. However, it could be software-implemented in an electronic commerce application and all communications are transmitted electronically between the parties' computing devices communicating via a communication network, such as the Internet.

The mediator can provide an electronic marketplace (e.g. a Web site) wherein sellers register their goods for sale, and shipping companies publish their shipping methods and rate charts, for buyers to choose from. The Web site is accessible to users via a communications network, such as the Internet. The buyers, seller and carrier can communicate though and interact through with the mediator's Web site, using an interface and interface software. For example, the seller, buyer and carrier interface may each comprise a personal computer running standard Web browser software and having network access capability. This way, the mediator's Web site (e.g. Web server) is interconnected with the buyer, seller and carrier interfaces (e.g. Web browsers) via a communications network such that information can be transmitted back and forth between the buyer, seller and carrier interfaces and the mediator's Web site.

The invention is implemented by software running on the mediator's Web site, through which an entity can enroll as a customer via an automated online registration process. Sellers will then register their goods for sale on the mediator's Web site, as is known in the art. Carriers will also publish their delivery methods, shipping rate charts, and any other information that is pertaining to automatically compute shipping options and freights that may be available for a potential parcel. This information is stored on the mediator's Web site, which includes functionalities for enables carriers to build and maintain a database of their delivery methods on this site. In alternative implementation, the mediator's Web site is integrated with the carrier's network, in which case this information is kept on the carrier's Web site, in a location that is accessible to the mediator's system.

Thus, the mediator's Web site contains the goods listed for sale by the sellers, and the delivery services and shipping rate charts published by the carriers. This way, the buyer may browse the mediator's Web site to view what goods are available for sale, and how these goods may be shipped. The mediator computer-implemented system handles transactional end of things, from goods trading between buyers and sellers, to the packages delivery to buyers by carriers. All these transactions are automatically facilitated by computer programs that implement the shopping process and the fulfillment operations.

When a buyer selects goods for potential purchase, and later processed to the checkout of his shopping cart, the selected items will be forwarded to the sellers of the goods for subsequent processing, as it is known in the art. While confirming the packaged goods, the seller may be required to provide information about the package, depending whether the seller relinquishes his shipping operations to independent carriers registered of the mediator's Web site. For example, the seller may be asked to provide the package weight and dimensions. These package characteristics are used by a computer program to compute and present the buyer with the delivery options available for his order. The computed shipping options include the delivery methods available from independent carriers, as well as those provided by the seller of the goods.

The buyer may then select an option to ship his package. Hence, this approach puts the buyer in control of the whole shipping process, since he will openly choose the carrier to be in charge of delivering his package, at the shipping freight he is willing to pay for.

The selected carrier will be contacted with the package information, and the selected shipping option to deliver it. This information may also include the package destination address and the estimated shipping cost, computed by the computer program using the shipping rate charts published by the carrier. The carrier may accept the package shipping request from the buyer or decline it. The carrier may also adjust the estimated shipping cost, if not accurate, in which case the buyer will have to either agree with the adjusted shipping freights or select another shipping method from any other carriers.

If an agreement is reached between the carrier and the buyer about the shipping arrangement, a payment will be requested from the buyer for the shipping freights associated to the delivery of his package.

Subsequently, the package pickup will be automatically scheduled and forwarded to all the parties involved (e.g. seller, carrier, and buyer). Then, the package will be delivered by the carrier, using the selected shipping option selected by the buyer.

The seller will be paid for goods sold, preferably when the pickup is completed. The buyer will also be charged a commission for the sale. After the package delivery, the carrier will be credited for the shipping freights, and he will be charged a commission for the facilitated transaction.

An important benefit of this invention is that it allows buyers to openly select shipping options that suit their needs from independent carriers, for goods purchased on the Internet from online sellers. Hence, the buyer is not limited to the shipping options provided by the seller of goods. Since buyers choose from shipping options provided by independent carriers, they may compare shipping rates from one carrier to the next to get reasonable and competitive shipping costs. In addition, buyers will be reinsured on the accuracy of the shipping charges, which are provided by the carriers themselves rather than the sellers of the goods. Buyers may also be more lenient about any lengthy delivery timeframe/delay since they decide what service they are willing to pay for, among broad range of delivery methods from carriers.

Another benefit of this invention is that it provides an alternative to reduce shopping cart abandonment in an easy way, among online shoppers. Indeed, since carriers provide the shipping options and costs for orders placed with the sellers of goods, buyers won't blame these sellers for charging excessive/unreasonable shipping freights for the delivery of their orders. In the other hand, this invention allows online sellers to relinquish their shipping operations to independent carriers, and then focus on their core business, e.g., sell their goods to consumers.

This invention also permits carriers to bypass online sellers as the middleman, and openly promote their services to online shoppers, which avoid carriers to compete for the sellers' shipping volumes by offering them discounted shipping rates as a marketing incentive. Instead, carriers may use these discounts to compete directly for online shoppers by offering more affordable shipping cost to online shoppers. This invention also provides small delivery firms with the opportunity to compete against large corporation, since they need not to offer discounts to sellers to handle their shipping volumes.

In the preferred embodiment, the mediator is compensated for creating a market for sellers and carriers by providing the technology infrastructure to customers, and for felicitating the transactions between parties and/or acting as a clearinghouse. For example, the seller will pay a nominal listing fee to register his goods for sale on the mediator's Web site. As known in the art, these listing fees may be based on the value of the good listed for sale. The sale commission charged to the seller of goods is calculated as a percentage of the item sale price, while the commission charged to the carrier is computed as a percentage of the shipping freights associated to the package delivery.

Other fees may also apply to sellers, such as item listing and storefront hosting fees, as known in the art. The mediator may also use other price structures. For example, the mediator may provide some of its service to customers at no charge. However, to offset a portion of the expense associated with providing the technology infrastructure its customers, the mediator may provide the purchasing and re-selling of Web page space for advertising to those clients wishing to reach its online community.

BRIEF DESCRIPTION OF THE DRAWINGS

These and other features of the invention will now be described with reference to the drawings of preferred embodiments, which are intended to illustrate and not to limit the invention, and in which:

FIG. 1 is a block diagram illustrating the system components in accordance with the invention;

FIG. 2A is a block diagram illustrating the general steps involved in the interactions between the users in one embodiment of the present invention;

FIG. 3 is a block diagram showing the general steps followed by the seller in registering goods for sale in one embodiment of the present invention;

FIG. 7B is a screen display showing an example of a shopping cart checkout performed by the buyer user in one embodiment of the present invention;

FIG. 7C is a screen display showing a package recipient address editing performed by the buyer user in one embodiment of the present invention;

FIG. 8 is a screen display showing an order view page used in one embodiment of the present invention;

FIG. 9C is a screen display of a package characteristics editor in accordance with the present invention;

FIG. 10B is a screen display showing an example of shipping options generated by one embodiment of the present invention;

FIG. 13B is a screen display showing an example of a payment confirmation editor generated by one embodiment of the present invention;

FIG. 14B is a screen display showing an example of a customer rating profile generated by one embodiment of the present invention.

FIG. 16 is a block diagram showing a system for selling shipping services online.

DETAILED DESCRIPTION OF THE PREFERRED EMBODIMENT

Figure 15:
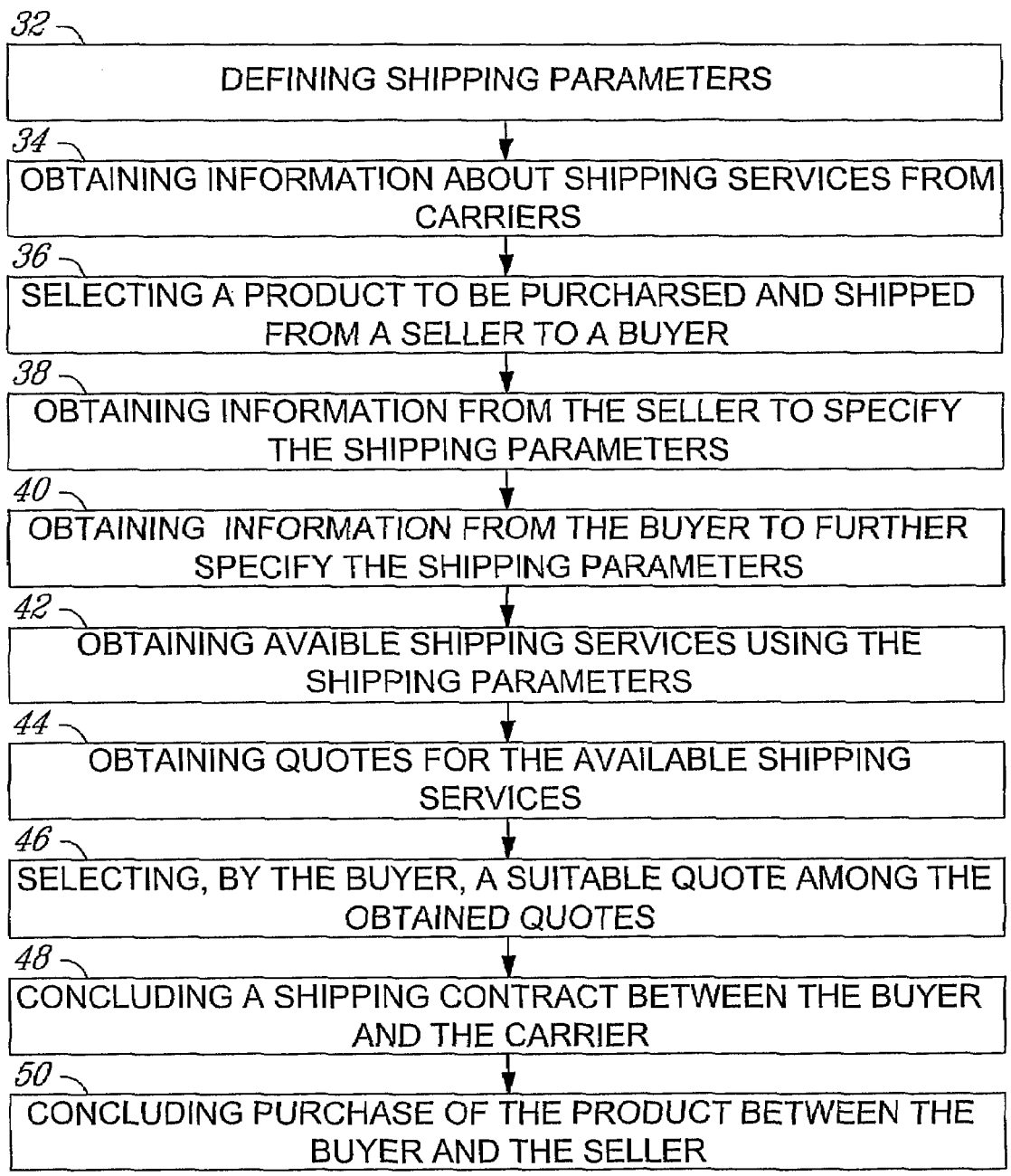
FIG. 15 is a flow chart showing a method for selling shipping services online through a mediator having a Web site.

FIG. 15 illustrates the steps of the invention from a high abstraction level. First, the shipping parameters are being defined 32, preferably by a mediator. Carriers provide then information about their respective shipping services to the mediator 34. Next, a buyer selects a product to be purchased from the mediator's Web site or from a third party's Web site 36. Thereafter, the buyer and the seller specify the shipping parameters through the mediator 38 and 40. Once the shipping parameters are specified, the mediator computes the available shipping services among all the shipping services specified by the carriers 42. Then, the mediator provides quotes for the computed available shipping services and presents it to the buyer 44. The latter selects then a suitable quote among these presented quotes 46. Based on the selected quote, a contract between the buyer and the seller is then concluded 48. Finally, the buyer and the seller conclude the purchase of the product 50.

FIG. 16 illustrates the structure of the invention from a high abstraction level. The buyer 10 sends a selection signal to the product selector 14 for selecting a product to be purchased. The product selector 14 sends the identity of the product selected by the buyer to the shipping parameter collector 16. The latter receives the shipping parameters from the buyer 10 and the seller 12 in connection with the selected product and sends it to the shipping option computing module 22. On the other hand, carriers 18 provide information about their shipping services to the shipping service information collector 20 that receives the information and transmits it to the shipping option computing module 22. The latter computes the available shipping services as a function of the received shipping parameters and the received information about the shipping services and sends it to the shipping service selector 24. Then, the buyer 10 selects through the shipping service selector 24 a suitable shipping service among the computed available shipping services. The selected shipping service is then transmitted to the shipping service notifying module 28 and to the transaction concluding module 26. The shipping service notifying module 28 sends a shipping service request in connection with the selected shipping service to the carrier 18. The latter sends back a response on the request to the transaction concluding module 26 and the latter forwards the received carrier response to the buyer. In case where the carrier 18 accepts the shipping service request, the contract is concluded and the transaction concluding module 28 confirms the contract to the buyer and sends him information about terms and conditions.

The following provides information about the invention from a lower abstraction level. To facilitate the understanding of the invention, the description of the preferred embodiment is arranged within the following sections:
1. Overview of System Components
2. System Operation And Processes
3. Actor Enrollment Function
4. Goods and Services Listing Function
5. Shopping/Trading Function
6. Order Checkout Function
7. Order Packaging Function
8. Order Shipping Function
9. Order Pickup Function
10. Order Delivery Function
11. Account Billing and Collection
12. Customer Rating Function
13. Glossary of Terms and Acronyms 1. Overview of System Components FIG. 1 illustrates the general architecture of the system that operates in accordance with the present invention. The components of the system include a buyer computer B01, seller computer S01, and carrier computer C01, all of which are connected to a mediator's Web site M01 by the Internet I01. In addition to these components, the system may also include a carrier Web site C05, and a third party Web site T01 wherein sellers can disseminate goods for sale. The user computers (B01, S01, and C01) are also linked to both the third party Web site T01 and the carrier Web site C01 by the Internet I01.

The user computer (B01, S01, and C01) may be any type of computing device that allows the user to interactively browse a Web site via a Web browser. For example, the user computer (B01, S01, and C01) can be a personal computer that runs a standard Web browser such as Microsoft's Internet Explorer or Mozilla's Firefox that uses the HTTP protocols (or another protocol capable of communicating with a Web server).

In the preferred embodiment, the mediator's Web site M01 is an online marketplace that provides functionality for enabling buyers, sellers and carriers to trade goods, and exchange services and information. Typically, this site is operated by a business entity that provides customers with the technology infrastructure to facilitate person-to-person transactions, and other functions associated to the sale of goods, from listing the goods throughout the entire fulfillment chain. These functions will be either facilitated or monitored by computer programs M03 running on the mediator's Web site M01. For example, the computer programs M03 can be Java Servlets that implements these functions. Typically, the mediator's Web site M01 includes a Web server M02 that interact with a store of Web documents M04 (in the form of HTML), and variety of databases through the computer programs M03. The databases may be any type of data repository (such as a SQL database, ASCII files, etc.). In the preferred embodiment, these databases may include, but not limited to, a customer database M05, product database M06, shipping database M07, and order database M08. Any HTTP request made to the mediator's Web site M01 will be received by the Web server M02 and if necessary forwarded to the computer programs M03. The computer programs M03 are implemented to relay data transfer between the Web Server M02 and the databases. For example, the computer program M03 may create an entry in theses databases (M05, M06, M07, and M08) or retrieve information from these data repositories, based on the request processed by the Web server M02. As it is also known in networking, this architecture is a "Client-Server" model, in which the Web browsers (B02, S02, and C02) running on the user computers (B01, S01, and CO), are the requesting programs, and are called the "Client". In the other hand, the Web server M02 (of the mediator's Web site MO) is the program which responds to the requests, and is referred to as the "Server".

The carrier Web site C04 is a site, typically operated by a business entity (for example, a shipping company) that provides its customers and visitors with web-based solutions. However, an individual may own and operate such as Web site. As it is known in the art, a carrier Web site C04 includes functionalities tailored to help users track their package delivery status, browse shipping zone and rate charts, and calculate delivery date, time, and cost for sending their shipments to destinations around the world. Such a site also allows users to establish an account for billing their shipping charges and services. Typically, the carrier Web site C04 includes a Web server C05 that processes any HTTP request, and then retrieves Web documents C07 or interacts with computer programs C06 for data transfer to/from a shipping database C08, a customer database C09, and any other data repository (not shown). In another embodiment, the carrier Web site C04 may be a site dedicated to conveying "soft" goods from the seller computer S01 (or third party's site) to a buyer computer B01 using a communications network such as the Internet. For example, the seller can list a downloadable content (e.g. music, electronic book, etc.) for sale on the mediator's Web site M01 or a third party Web site T01. Subsequently, this content can be accessed from this site by a "soft goods" delivery software program provided by the carrier. The carrier may then retrieve and format the content (if necessary), and finally transmit the encoded version of the content to the buyer computer B01.

The architecture of the system may also involve a third party Web site T01. Such a Web site may be any site wherein sellers may disseminate goods for sale or provide additional information and services, related to the goods listed on the mediator's Web site M01. In one embodiment, a seller can market a subset of goods on an online marketplace other than the mediator's Web site. For example, the seller can disseminate goods for sale on an "outside" marketplace such as eBay, at www.ebay.com. In another embodiment, the third party Web site T01 can be an online storefront site maintained and operated by the seller himself, wherein the seller may, for example, feature a subset of his goods listed for sale on the mediator's Web site M01 and/or a third party site T01.

2. System Operation and Processes

In operation, as discussed above, the user computer (B01, S01, and C01) include a conventional Web browser (B02, S02, and C02) that communicates with the mediator's Web server M02 using the HTTP protocols (or another protocol capable of communicating with a Web server). In the system architecture presented above, the mediator's Web site M01 (or Web server M02) is interconnected with the buyer, seller and carrier interfaces, e.g. the computers B01, C01, and B01 (running a Web browser B02, C02, and C02) via a communications network (e.g. the Internet I01) such that information can be transmitted back and forth between the buyer, seller and carrier interfaces and the mediator's Web site, and such as the mediator's Web site M01 (or Web server M02) can transmit information back and forth between a carrier and third party Web sites.

The mediator's Web server M02 forwards any request to a computer program M03. The computer program M03 accesses a HTML document M04 (located on the mediator network) that can be requested, retrieved and viewed by the user via the Web browser (B02, C02, and S02) as a Web page (B03, C03, and S03). The Web server M02 (of the mediator's Web site M01) also interacts with various computer programs M03, which are implemented to relay data transfer between the Web Server M02 and the databases (M06, M05, M06, M07, and M08). Access to the mediator's Web site M01 is available to any client computer (B01, C01, and S01) via the Internet I01. Based on the HTTP request submitted by a user, the Web server M02 (of the mediator's Web site M01) will also interact with a third party Web site T01 and a carrier Web site C04 to retrieve or submit specific information.

A user may log on and anonymously browse the mediator's Web site M01. However, some transactions on the mediator's Web site MO required users to authenticate themselves by providing login account information (for example, username and password). For those who are used to tracking a Internet session, a computer program M03 can use a combination of a user ID and other pre-defined combination of characters to embed a "masqueraded ID" within Web pages (B03, S03, and C03) sent to the Web browsers (B02, S02, and C02) running on the user computers (B01, S01, and C01). Indeed, once a user is identified (based on his login information), the mediator's Web site M01 may dynamically includes the user ID within hyperlinks of personalized Web page sent to the Web browsers. When the user subsequently selects such a hyperlink (embedded within a Web page) from the Web browser to trigger an event, the mediator's Web site MO will extract this ID to identify the user and accordingly handle the request sent by the Web browser. In another embodiment, instead of dynamically embedding the user ID within the Web documents sent to the Web browser (B02, S02, and C02), the mediator's Web site MO may use other technologies. For example, the mediator's Web site MO can use Java HttpSession or cookies technologies, among others, to track a specific transaction session. This is very useful since the user ID assigned to a user is never sent out of the mediator's Web site MO or revealed, for security and/or data consistency reasons. Users can then browse the mediator's Web site M01 without ever knowing the ID assigned to them.

FIG. 2A illustrates the general flow of information between the system components when the users exchange goods, services and communications through the mediator's Web site M01, and in the physical world. The system includes automated software program M03 that are implemented to handle these operations online. Typical interactions between the users may include the following events:

(A) the enrollment of a users on the mediator's Web site M01, as a buyer, seller or carrier, (B) the dissemination of goods for sales by the seller, on the mediator's Web site M01 and/or on a third party Web site T01, (C) the dissemination of delivery services by the carrier, on the mediator's Web site M01, or the carrier's Web site C04, (D) the selection of products by the buyer from the seller, on the mediator's Web site M01 or any third party Web site T01, (E) the notification of the seller for purchased goods, (F) the packaging of selected goods and the confirmation of the order, by the seller, (G) the calculation of the shipping charges associated to the order delivery, and the presentation of the shipping options to the buyer, (H) the selection of a delivery method by the buyer, for the order placed with the seller, (I) the notification of the carrier with the selected delivery method by the buyer, and the estimated shipping charges, (J) the confirmation of the delivery service and shipping rate, by the carrier, (K) the notification of the buyer, seller, and carrier, with the order pick-up and delivery schedule, (L) the pickup of the package by the carrier, from the seller, (M) the delivery of a package to the buyer, by the carrier.

Figure 2B:
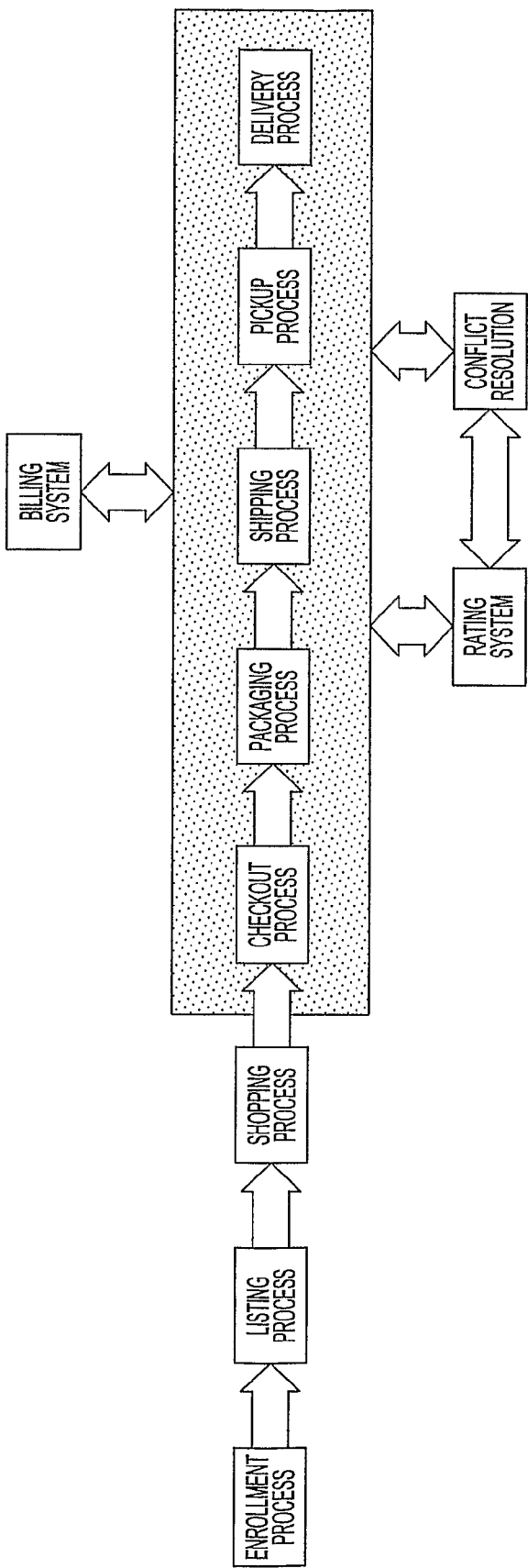
FIG. 2B is a flow diagram showing the processes involved in one embodiment of the present invention.
Figure 4:
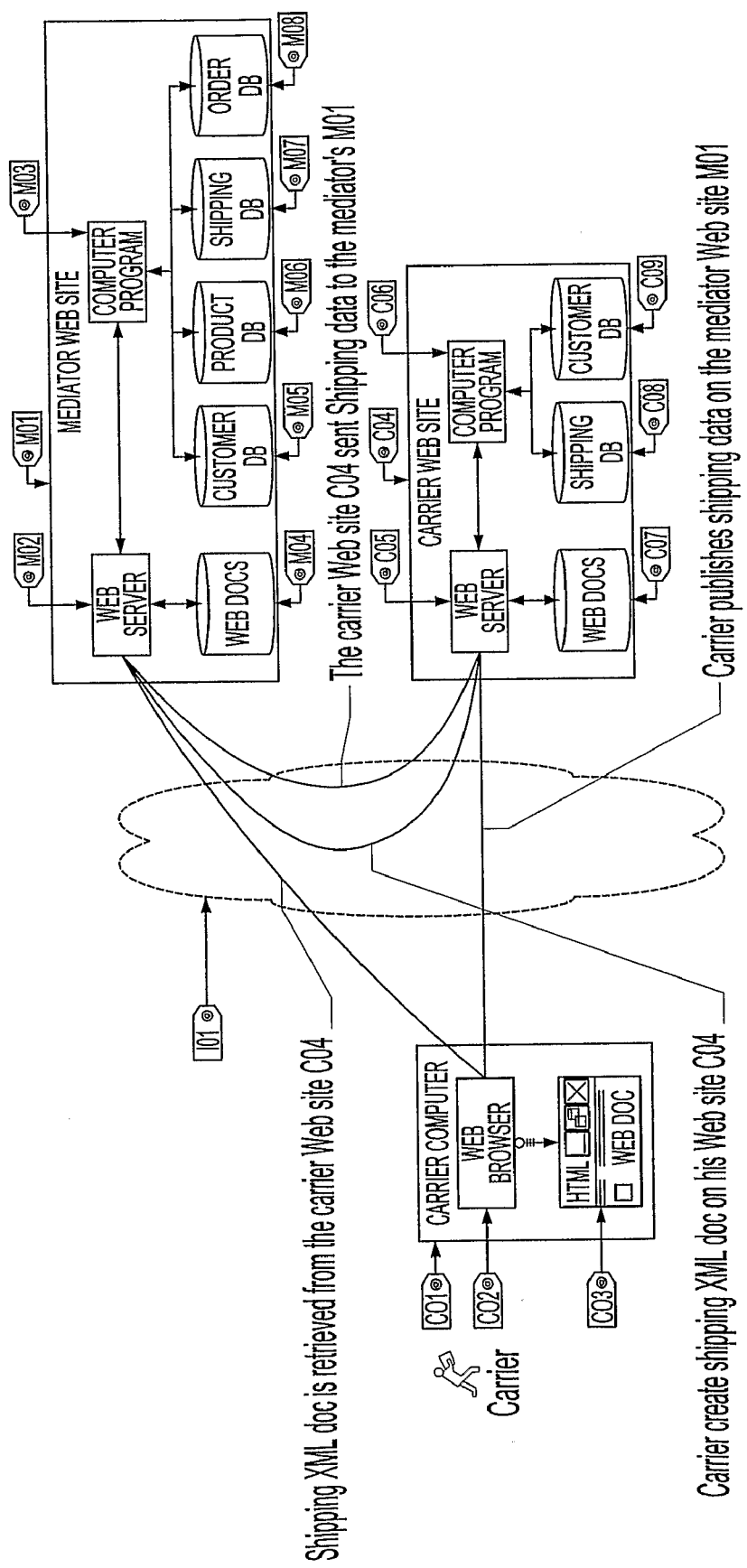
FIG. 4 is a block diagram showing the general steps followed by the carrier in publishing shipping methods in one embodiment of the present invention.
Figure 5:
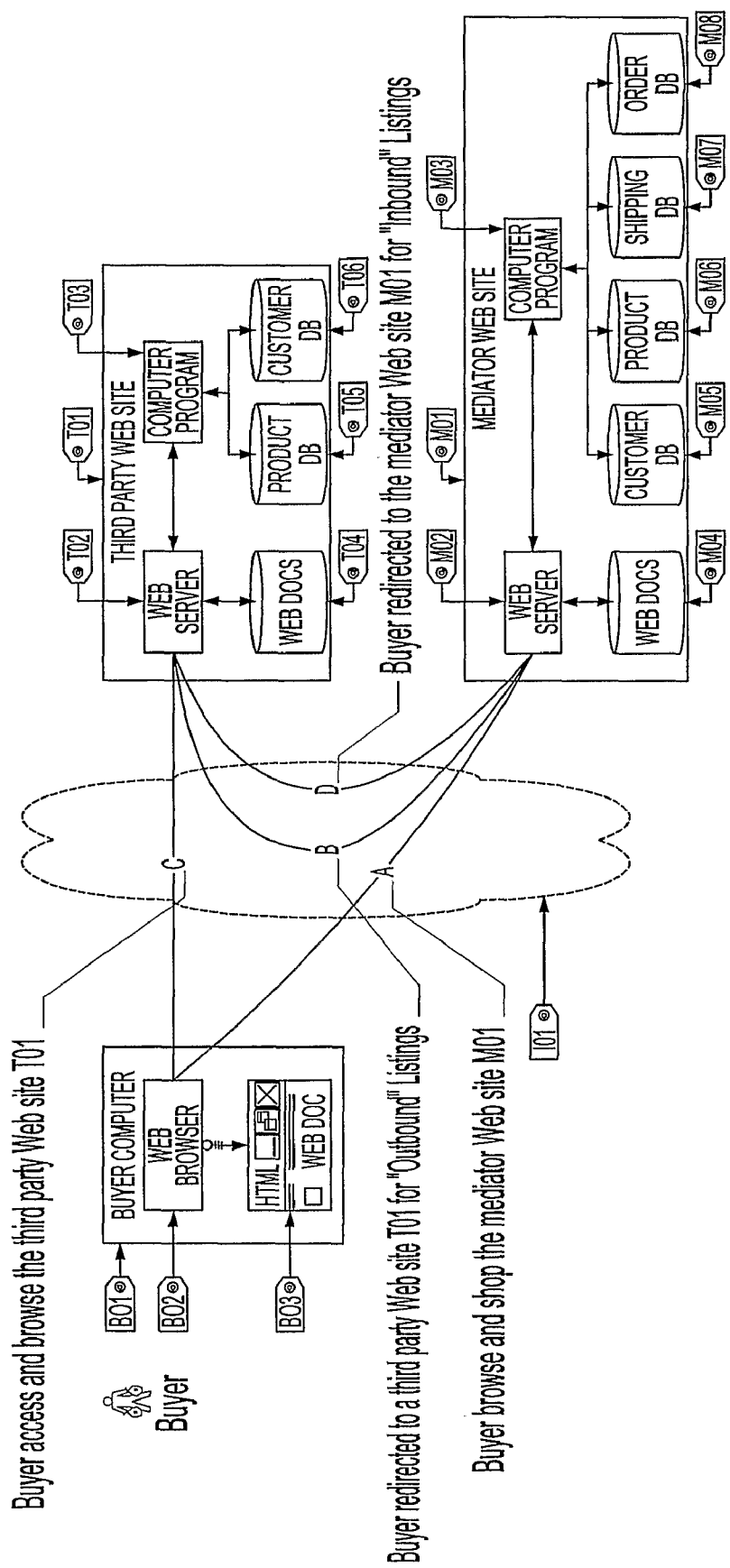
FIG. 5 is a block diagram showing the general steps followed by the buyer in shopping for goods in one embodiment of the present invention.
Figure 6:
FIG. 6 is a screen display showing an item view page used in one embodiment of the present invention.

To efficiently describe the present invention and its functionality, the above operations are grouped by processes. In the preferred embodiment, these include the following: enrollment (A), listing (B-C), shopping (D), checkout (E), packaging (F), shipping (G-K), pickup (L), and delivery (M). The preferred embodiment also includes the collection and customer rating processes (not shown). The collection process includes the user account billing and collection of payment associated to goods and services traded on the mediator's Web site M01. And, the customer rating process is the automated evaluation of the various transactions each customer is involved, with an automated generation of internal scores based on the conclusion of the transactions parties may be involved in. FIG. 2B illustrated all these processes that encompass all the actions performed by users while interacting via or with the mediator's Web site M01. These processes are described in more detail below. Other functionalities of the system, which operate in accordance with the present invention, are also discussed.

It should be appreciated that all processes of the system may be implemented in a variety of ways. For example, these processes and functionalities may be implemented by only a unique software program, rather than using separate software programs to implement their functionalities. However, in the preferred embodiment, most processes are implemented by separate software programs, as discussed below.

3. Actor Enrollment Function

The mediator's Web site M01 includes automated enrollment software (computer programs M03) that implements an online registration process for allowing an individual and business entity to register as a customer (e.g. seller, buyer, and/or carrier). Access to the mediator's Web site M01, and the enrollment program M03, is available to any client computer (B01, S01, and C01). As it is known in the art, an online registration process of an entity may include the following: (1) the presentation of an online application form (including a user agreement) to an applicant, (2) the generation and assignment of a unique ID (referred to herein as a "user ID") to an applicant, (3) the transmission of instructions related to the account assigned to an applicant.

The enrolling entity begins the enrollment process by selecting the proper hyperlink from a registration Web page on the mediator's Web site M01, and containing online registration instructions. These documents may, for example, include information about registering online to become a registered customer on the mediator's Web site M01. The request generated by the applicant is sent to the mediator's Web server M02, which in term accesses a store of HTML documents M04 (located on the mediator's Web site M01) and returns a registration application document to the enrolling entity's Web browser (B02, S02, or C02).

The registrant can then fill out the detailed online application form and provides the mediator's Web site M01 with the completed registration application that is processed by enrollment software. In the preferred embodiment, customer accounts are identified as buyer, seller, and carrier. However, an applicant can qualify for all these account profiles. All applicants will be required to provide personal and contact information, including a valid email address. Additionally, sellers and carriers must provide valid credit card information.

In addition to the above information, the registration software may also requests information about an enrolling entity's business, including whether a Web site is to be used by the entity. If the business entity has a Web site or plans to set up one, the application request requests information about such a Web site. As discussed above, an entity can have its own Web site. For example a seller can operate and maintain its own Web site and a carrier can have an Internet presence. However, an entity is not required to have an established Web site at the time of enrollment, and need not to set up one after enrollment since they can host goods and services on the mediator's Web site M01.

An applicant for a carrier account must also provide information about his/her business. Specifically, a carrier must fill out an online enrollment form and provide geographical locations where parcels can be picked up, and destinations where they can be delivered. An applicant for a seller account will also be prompted to fill out a form about its business. A seller must provide a description of the business, and enroll into predefined product categories. The seller must provide an email address where all orders notification can be sent and a postal address (e.g. store, warehouse, home, etc.) where orders may be picked-up. However, branded merchants may provide multiple pickup addresses depending of the geographical locations of their business divisions.

Once the online application form is completed by the enrolling entity, it is sent from the enrolling entity's computer (B01, C01, and S01) to the mediator's Web site M01 for further processing. In response to a submission of the enrollment form, the Web server M02 (on the mediator's Web site M01) initiates a computer program M03 (such as a Java Servlet comprising an enrollment sub-program) that processes the information contained on the electronic registration form. The enrollment function is preferably handled on the mediator computer systems. However, this function could be performed by dedicated, physically distinct computer systems or sites.

If the enrolling entity is registering as a buyer, the enrollment software automatically accepts the application form (if no particular error is found). In the case of a seller or carrier account, the registration process may also involve a background checkup (either automatically or with human intervention) for pre-specified criteria. If the applicant qualifies for such criteria, the application is completed, and the enrollment software accepts the application.

Then, the enrollment software generates a unique user ID to be assigned to the applicant. The enrollment software also creates an entry in the customer database M05, corresponding to the enrolling entity. More specifically, the software stores the user ID and the information provided by the enrolling entity as a unique entry into a customer database M05. This database entry allows the mediator to properly identify and track any customer involved on the mediator's Web site M01.

Following acceptance of an application, the enrollment software automatically generates and transmits an electronic mail message to the email address of the approved entity. This electronic mail message is confirmation of the approval and usually it contains information about the customer login account, e.g. username, password and other relevant information. If the approved applicant is a seller or a carrier, the information provided into the electronic mail includes detailed instructions on how to create and publish goods and services on the mediator's Web site M01.

In one implementation, these instructions may also include links to resources and/or downloadable programs that can be used to efficiently disseminate goods and services on the mediator's Web site M01. After enrolling on the mediator's Web site M01, customers (seller, carrier, and buyer) will be allowed to participate to trading activities on this site.

Customers can modify their account information during profile management sessions, without the intervention of the mediator. Many alternative formats of the application form are possible; the case discussed above is only representative of the type of information that may be requested to the registering entities. Others forms of enrollment processing may be used, including but not limited to regular mail and electronic mail.

4. Goods and Services Listing Function

Upon enrolling on the mediator's Web site M01, an entity who registered as a seller, will be allowed to disseminate goods for sales on this site, or conduct sales activities on a third party Web site T01 via the mediator's Web site M01. As discussed above, the seller can access the mediator's Web site M01 through any standard Web browser S02 running on the seller computer S01, which communicates with the Web server M02 of the mediator's Web site M01. Based on the seller request, the Web server M02 of the mediator's Web site M01 will retrieve a Web document M04 in the form of HTML that is return to the Web browser S02 running on the seller computer S01, and displayed as a Web page S03.

The seller is prompted to provide detailed information about the item to be listed by filling out a HTML form included into the Web page S03 served by the Web server S02. This information includes features of the item as specified by the seller. Preferably, this information includes any relevant descriptions that assist a buyer in making informed purchasing decisions. This information can also include the good sale format. For example, the seller can choose to list the good to be traded as an auction-style variable price item, a traditional fixed-price item, a barter-style item, or any other online trading concept that translates to a good acquisition. In addition to typical information relevant in describing the item, the seller will also be requested to provide other specifications that may be relevant to estimate the item shipping cost.

In the preferred embodiment, the seller will need to provide the dimension and weight (if possible) of any "hard" good. In the case of a "soft" good such as a downloadable content (for example, music, video, computer program, etc), the seller will also be required to provide the size and the URL where the item can be accessed and/or downloaded (for "soft" goods). As also known in the art, these listing functions can also be accomplished by using third party software programs, such as sales automation service providers (SASP).

When the seller submit the product description form to the mediator's Web site M01, the Web server M02 process the request by interacting with a listing software (computer program M03) implemented to create an entry in the product database M06, according to the product description provided by the seller. Typically, the listing software scans the item description provided by the seller for pre-specified terms and to flag the description for further review, such as by a staff member, if such terms are found.

In another embodiment, the listing can automatically be rejected by the listing agent if such terms are found. If no such term is found, the listing software accepts the listing and generates a unique ID to be assigned to the listed item. The listing software then registers the good for sale by creating an entry in the product database M06, corresponding to the listed item. More specifically, this software stores the item ID, the product information provided by the seller, and the seller's ID as a unique entry into a product database M06. This database entry allows the mediator to properly identify and track any good listed on the mediator's Web site M01.

The seller can also disseminate goods for sale on a third party Web site T01. If the seller chooses to feature its goods on a third party Web site T01, the mediator's Web server M02 will interact with a dedicated computer program M03 to post the product information on the third party Web site T01. For example, the listing software (running of the mediator's Web site M01) can format the product information and redirect it to the third party Web server T02. The Web server T02 can then interact with another computer program T03 (running on the third party Web site T01) to store this information in a potential product database T05.

Any other technology and/or procedure can also be used to disseminate goods on the third party Web site T01. This also but not limited to those discussed below. For example, the seller can list the product for sale on the third party Web site T01, independently to the mediator's Web site M01. However, because the product information will not be available on the mediator's Web site M01, the listing software needs to retrieve this information from the third party Web server T02, and then create an entry in the product database M06 (on the mediator's Web site M01).

In another embodiment, a dedicated computer program T03 (on the third party Web site T01) can intercept the product information submitted by the seller, and then redirects this information to the mediator's Web site M01. Another alternative is to use a computer program T03 to create a XML document of the product information, and then store this XML document on the third party Web site T01 in a location that is accessible to the mediator's Web server M02. The seller can subsequently "instruct" the listing software (of the mediator's Web site M01) to request the XML document stored on the third party Web site T01, and then retrieve the product information. This information can then be used by the listing software (of the mediator's Web site M01) to create an entry in the product database M06.

It should be appreciated that other alternatives for disseminating goods, on the third party Web site T01, may be implemented in a variety of ways. The case discussed above is only representative of the type of procedures and technology that may be used to accomplishing these tasks.

In all implantations, the goods listed (or featured) on the third party Web site T01, which information is stored in the product database T05, can be cross-linked to those available on the mediator site M01, which information is stored in the product database M06.

The mediator's Web site M01 also includes listing software (computer program M03) that enables a carrier to disseminate delivery methods on the site. The listing software processes the information provided by the carrier, through the Web browser C02 running on the carrier computer C01. This software is implemented to create an entry in shipping database M07 according to the information provided by the carrier. This information includes a detailed description of delivery services, such as the geographical locations where the carrier will pickup orders from a seller, the shipping destinations served by the service (where the carrier delivers parcels to buyers), the delivery timeframes on a destination-basis, shipping rate charts, and any relevant information that may assist a buyer in selecting such as shipping method. The shipping rate charts is based on potential package characteristics, which may include, but not limited to the package weight, dimensions (length, width, and height), pickup location (departure), and shipping destination.

In another embodiment, the carrier can operate a Web site C04. In this case, the carrier can host the delivery service on this site, with the service information stored in a shipping database C09. The carrier Web site C04 will then be integrated to interact with the mediator's Web site M01. The carrier can use a computer program C06 to create XML documents describing each delivery service, and stored in a location that can be accessed by the Web server M02 of the mediator's Web site. In this case, shipping calculation software (computer program M03) on the mediator's Web site M01 will request the XML document (stored on the carrier Web site C04) and retrieve the delivery service information comprised into the document.

In another implementation, the computer program C04 can be implemented to automatically retrieve the information from the shipping database C08 on the carrier Web site C04 (or network), based on the request made by the mediator's Web site M01. In both implementations, the information stored in the shipping database C09, can be retrieved from the carrier Web site C04 (as discussed above), passed to the Web server M02 of the mediator's Web site M01, and redirected it to any "calling" computer program M03.

5. Shopping/Trading Function

After a period of time, the buyer can access the mediator's Web site M01 or a third party Web site T01, using the Web browser B02 (of his computer B01) to communicate with the Web servers (M02, T02) of these sites. Then, the buyer may browse the goods listed for sale by any registered seller.

As known in the art, during a typical shopping session, the buyer may request information about specific goods presented for sale, using a standard Web browser B02 (running on his personal computer B01). Depending on the requests made by the buyer, the Web server M02 may interacts with shopping software (computer programs M03) that is implemented to retrieve product information from the product database M06. Any technology can then be used to retrieve more information about the goods presented for sale. As discussed above, this information includes any relevant information of the good that assists the buyer in making informed purchasing decisions. The details about the goods are prompted to the buyer for prospective purchase, via the Web browser B02 (running on his computer B01).

As discussed above, the goods registered for sale on the mediator's Web site M01 can also be featured on a third party's site T01. For example, a seller may feature on his goods that are actually available for sale, e.g. traded, on the mediator's Web site M01. In the other hand, these goods may be traded on the third party Web site T01, such as a marketplace wherein the seller registers goods for sale.

When the good is traded on the third party's site T01 (for example, another marketplace), the listing is referred to herein as "Outbound" listing or "Outlet". However, if the good is only featured on the Web site T01 owned by the seller, but is traded on the mediator's Web site M01, the listing will be referred to herein as "Inbound" listing or "Inlet". In both cases, the goods information is stored in the product database M06 on the mediator's Web site M01. As discussed above, the listing software formats the goods information (if necessary) before redirecting it to the third party Web site T01, where the good is listed as an "Outbound" or an "Inbound" listing. In both cases, the goods listed (or featured) on the third party Web site T01 are cross-linked to the listings of those available on the mediator site M01.

If the third party's site T01 is an online marketplace (for example, eBay.com), the listed good are actually traded on this outside marketplace, and a buyer who visits the mediator's Web site M01 and clicks on such a listing, will be redirected to the third party web site T01 to trade on the item. However, if the third party Web site T01 is operated by the seller, these goods will only be featured in a dedicated section of the seller's Web site, and a buyer who visits this and clicks on such a listing, will be redirected to the mediator's Web site M01 to trade on the item.

In the preferred embodiment, the fulfillment tasks associated to the sale of these goods (on the third party Web site T01) are handled on the mediator's Web site M01, as discussed below. However, buyers need not to be registered with the mediator before trading on the goods available for trade on the third party Web site T01. However, as also discussed below, the buyer will be required to provide relevant information (for example, a contact address) that can be used by the seller, and if necessary the carrier, to process and delivery the purchased goods.

As part of the goods trading (or shopping) process, a buyer may instantly add a good to his shopping cart, or the good may be automatically added to the buyer's shopping cart at a later time, depending on the selling format of the good. As it is known in the art, if the good is listed as a traditional fixed-price item, the buyer can instantly select and add the item to his shopping cart. However, if the seller has registered the good for sale as an auction-style variable price item, the buyer may participate to a bidding context of the very good. If the buyer wins the auction, the good is automatically added to the buyer's shopping cart at the end of the bidding context. This procedure may also be used for any other sale formats and trading concepts, including, but not limited to, that involve items bartering.

In all implementations, a unified shopping cart data structure is created, where the buyer's items selection is added for prospective purchase. The buyer may also include goods selected from a third party Web site T01, only if the seller of the goods is registered on the mediator's Web site M01. The shopping cart is a buyer-specific hierarchy. This shopping cart will be maintained in database (not shown) on the mediator's Web site M01. The information stored within the shopping cart includes a list of the goods that have been selected for prospective purchase, together with an identifier of the seller from whom the goods has been selected.

The buyer shopping cart may persist on the mediator's Web site M01 for an extended period of time, depending of the mediator's settings), thereby allowing the buyer to conduct extended shopping sessions. For example, the period extent can be defined following the most recent update of the shopping cart by buyer. However, since a buyer can add new goods selection to the shopping cart, the period extent can be based either on the most recent update of the shopping cart, or on the oldest item added to the shopping cart.

In alternative embodiments, the seller may also host the fulfillment tasks associated to the sale of these goods on the mediator's Web site M01, or relinquish these tasks to the third party's site. If the seller handle these fulfillment tasks on the mediator's Web site M01, as discussed below, any purchases made on the third party web site T01 (from seller registered with the mediator), will be added to the order database M08 (of the mediator's Web site M01), and will be handled accordingly, as regular orders placed via the mediator's Web site M01.

6. Order Checkout Function

When the buyer proceeds to the checkout of his shopping cart stored on the mediator's Web site M01, the order dispatching to the sellers of goods is initiated.

The checkout process is implemented by a computer program M03, referred to herein as the checkout manager that runs on the mediator's site M01. The checkout process will now be described with reference to FIG. 7A, which is a flowchart showing the interactions between the buyer, seller, and the checkout manager, as implemented in one embodiment of the present invention.

As discussed above, the shopping cart maintains a buyer-specific record of the goods selected by the buyer. This includes the description of the goods, the identities of any sellers of goods who market them, and the sale point (the mediator's Web site M01 and/or a third party's site T01) wherein the goods have been traded and selected. However, as also discussed above, the shopping cart may include a good selected on a third party Web site T01 only if the item is registered on this site as an "Outlet" listing, by a seller who has registered on the mediator's Web site M01.

The checkout manager will first retrieve the shopping cart information (stored on the mediator's Web site M01. Then, it will display the shopping cart to the buyer as illustrated on FIG. 7A. More specifically, the checkout manager extracts and uses the information stored in the shopping cart database to identify the sellers where goods were selected by the buyer. This is performed by keeping track of each seller unique ID that is also stored within the shopping cart. When the buyer is presented with his pending goods selection, e.g. those items that haven't been processed yet, he may select specific goods to include within a package, and/or postpone the checkout of some items to a later date. In the preferred embodiment, goods included within a package, are from the same seller and per sale point basis. However, in alternative embodiment, a seller may include goods ordered with a given seller, from multiple sale points, may be included within the same package. The buyer may repeat this operation to checkout all of his goods within the shopping cart, and then create an order to be forwarded to the seller of goods. The buyer will then provide the shipping information for each package created by selecting goods displayed within the shopping cart. As shown on FIG. 7B, which depicts an example of the screen display of the shipping information editing step during the checkout process, such information will typically include the name and contact address of the buyer (or any potential recipient).

The information collected by the checkout manager will then be used to automatically generate a standard order for each seller of goods. The checkout manager will then store the order on the mediator's Web site M01, by creating an entry in the order database M08. More specifically, the checkout manager automatically generates and stores a unique order ID, along with the seller unique ID, descriptions of selected goods, shipping information (recipient's name and address), along with information, as an entry into the order database M08. This database entry allows the mediator to properly identify and track any order placed with a seller of goods on the mediator's Web site M01 and/or a third party's site T01.

Figure 8:
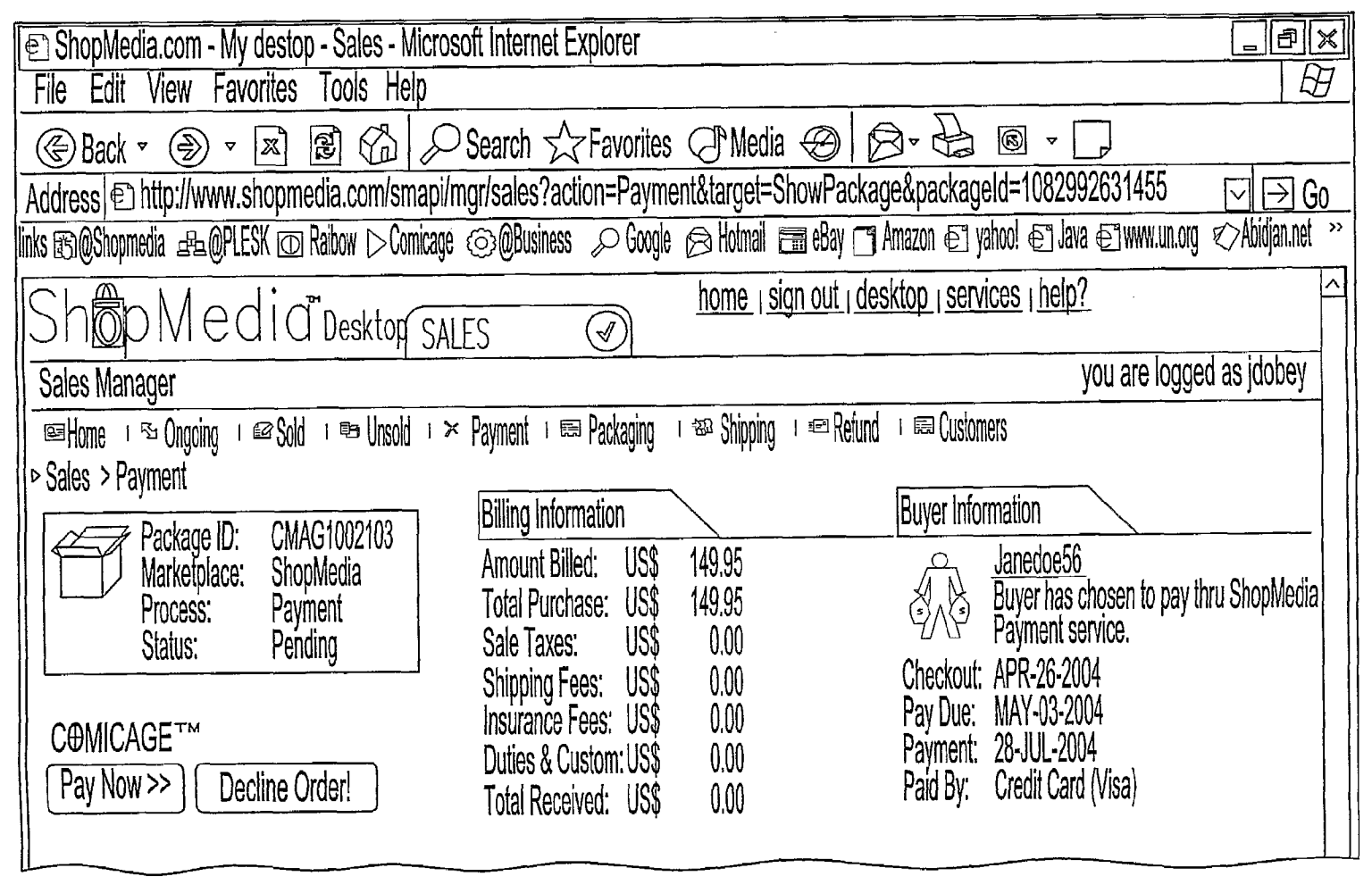

FIG. 8 illustrates a screen display of a standard order (or package) as implemented in one embodiment of the present invention. As shown on FIG. 8, the package description is divided into many sections, which include the package references, the order billing information, the buyer information, the seller information, the carrier information, the recipient information, and the description of the goods selection. This information allows the mediator to properly identify and track the processing stages of the order, e.g. package, from the checkout of the shopping cart by the buyer, to the delivery of the package to a potential recipient by the carrier. The package sections are further discussed below.

Referring to FIG. 8, the package is identified to users by a unique reference ID, that is human readable and that may be different from the unique ID generated by the checkout manager to internally track the same order. The mediator uses the package reference ID to refer to the very order during the communications with the buyer, seller and carrier. The package reference section also includes identifiers of the sale point (or marketplace) wherein the order was placed, the order processing stage, and a flag to track the status of the order at a given processing stage. For example, an order placed with a seller on the mediator's Web site M01 may have a reference ID such as "SHOP003", with the sale point (marketplace) identified by "SHOPMEDIA"; while the order processing during the payment stage will be identified as "Payment", and the status at this processing stage (e.g. payment stage) before clearance will be identified as "Pending".

The billing information on the package screen display typically includes the total amount billed for the order, which comprises the total purchase (e.g. cost of selected goods), sale taxes, shipping fees, package insurance fees, and duties and customs. Since the buyer may issues multiples payments for the same order, the total amount made for a specific order is also recorded and displayed as the summation of all these payments issued by the buyer.

The buyer information section will typically include the buyer's user ID (or name), the date of the shopping cart checkout, the due date (or deadline) of the order payment, the date of the latest payment, and the payment method used by the buyer. Hence, the mediator (or a computer program) may use this information to find out, for example, when the buyer processed to the checkout of his shopping cart, or if he completed the order payment before the deadline. Based on the conclusion of these tests, for example, a computer program (customer rating system) may automatically generate an internal score and then rate the buyer, as will be discussed below.

The seller information section will typically include the seller's user ID (or name) and address. The contact address may be for example, the location of a warehouse, the seller's physical store, a house, or any other location where packages may be picked up by a potential carrier. The seller information section also includes an identifier, referred to as "Packaging" used by the mediator to tack the order packaging steps. For example, in the case of a partial order processing, this flag may be assigned the value "Partial (Missing Items)". The seller section also include the expiration date (deadline) of the package confirmation by the seller, the date the package was actually confirmed by the seller, and the date/time the package is scheduled to be picked-up by the carrier from the seller's location. The mediator (or a computer program) uses this information to find out, for example, if the package was confirmed by the seller as planned, and if the package was picked-up by the carrier as scheduled. Depending on these tests, a computer program (customer rating system) may automatically generate an internal score and then rate the seller, as will be discussed below.

The carrier information section typically includes the carrier's user ID (or company name) and business address. This information is used to communicate with the specific carrier for any issue regarding the shipping of the package. The carrier section also includes the name and timeframe of the shipping method, previously selected by the buyer, to be used to deliver the package. For example, if the buyer has selected the service "FedEx, Express delivery", which delivery timeframe may be "1 to 2 Business days" depending on the buyer' location, this information will be displayed (as such) on the carrier section. The carrier section also includes an expiration date (deadline) before which the carrier must confirm (or decline) any delivery request received from a buyer. This section also includes the actual confirmation date of the shipping request. The mediator (or a computer program) uses this information to find out if the shipping request was confirmed by the carrier as planned, and/or if the package was picked-up by the carrier as scheduled (from the seller location, as discussed above). Depending on these tests, a computer program (customer rating system) may automatically generate an internal score and then rate the carrier, as will be discussed below.

The recipient information section typically includes the name of the buyer (or any potential recipient) and his contact address, which is also the actual package shipping address. Additionally, the recipient section specifies the preferred delivery time of the package, as specified by the buyer. For example, a buyer may prefer his package to be delivered at a specific period of the day, such as in the morning, in the afternoon, or at anytime of the day. The recipient section also specified the estimated date the package is expected to be delivered, as well as the date the package may actually be delivery. The mediator (or a computer program) uses this information to keep track of the package delivery process as planned. Depending on the conclusions of the delivery process, a computer program (customer rating system) may automatically generate an internal score and then either rate the carrier and/or the buyer, as will be discussed below.

Finally, the package information includes descriptions of the goods within the package. In one embodiment of the present invention, the good descriptions will include the item number (or reference), title, ordered quantity, price and order/selection date. However, alternative descriptions may be used. In all implementations, these descriptions will be used to track the goods within the package.

The package information (as shown on FIG. 8) will be displayed to all parties involved. This way, each party will be kept informed about what others have already done and what is expected to be done by each party in the upcoming processes, as will be now discussed below with further reference to FIG. 8.

7. Order Packaging Function

As discussed above, when the buyer proceed to the checkout of (some of) the goods within his shopping cart, the checkout manager (that implements the checkout process) generates a standard order using the information collected from the buyer and the descriptions of the goods included within the shopping cart. Then, the checkout manager creates an entry in the order database M08 to store the newly generated order. Subsequently, the packaging process is initiated. In the preferred embodiment, the packaging process will be triggered by the checkout manager each time a buyer checkout a shopping cart, and then a new entry is created in the order database M08. In an alternative embodiment, another computer program, running on the mediator's Web site M01, may be used to perform periodic tests, to find out if new entries have been created in the order database M08. Then, the dedicated computer program may initiate the packaging process, based on these tests.

Figure 9A:
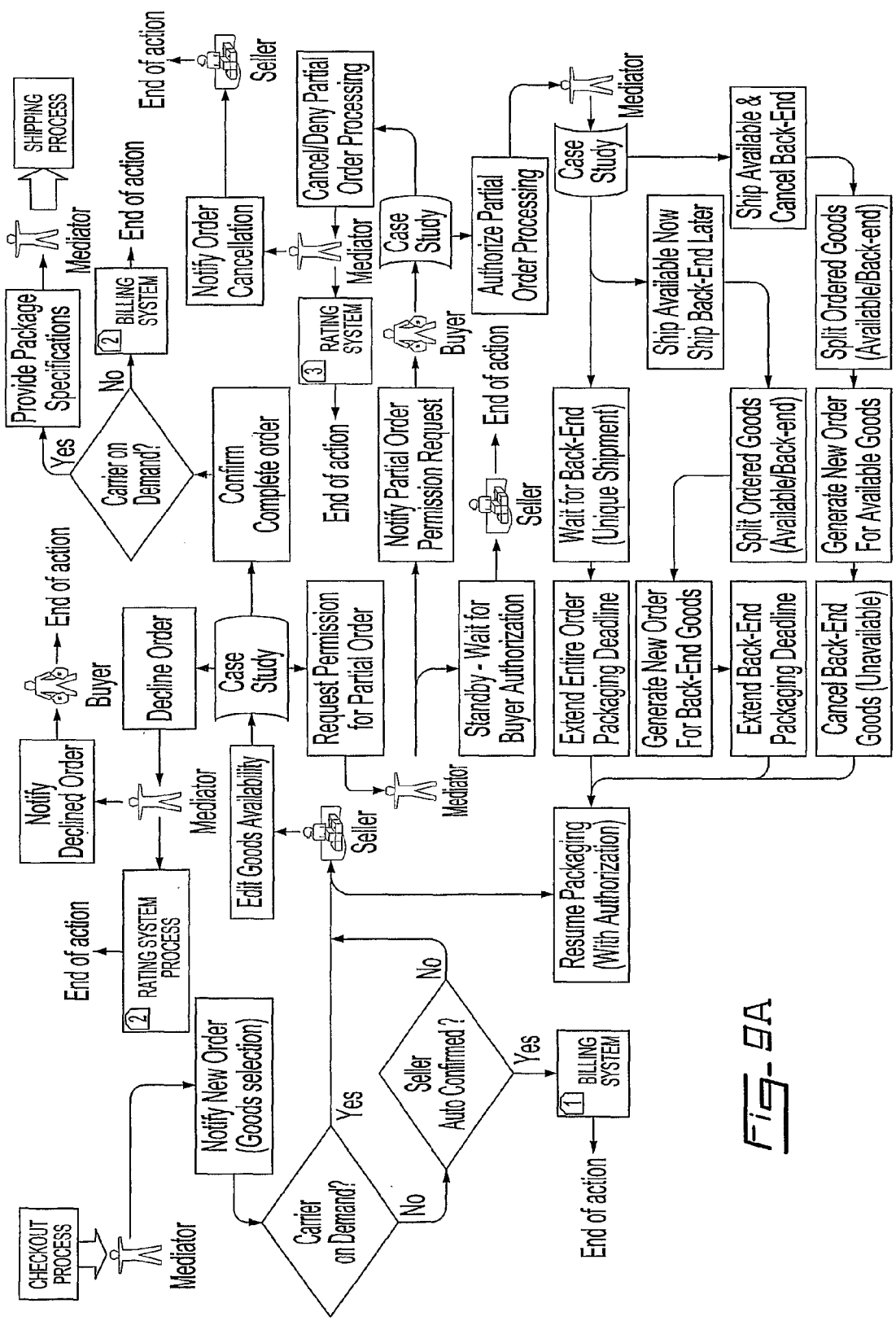
FIG. 9A is a flowchart illustrating the packaging process used in one embodiment of the present invention.
Figure 9B:
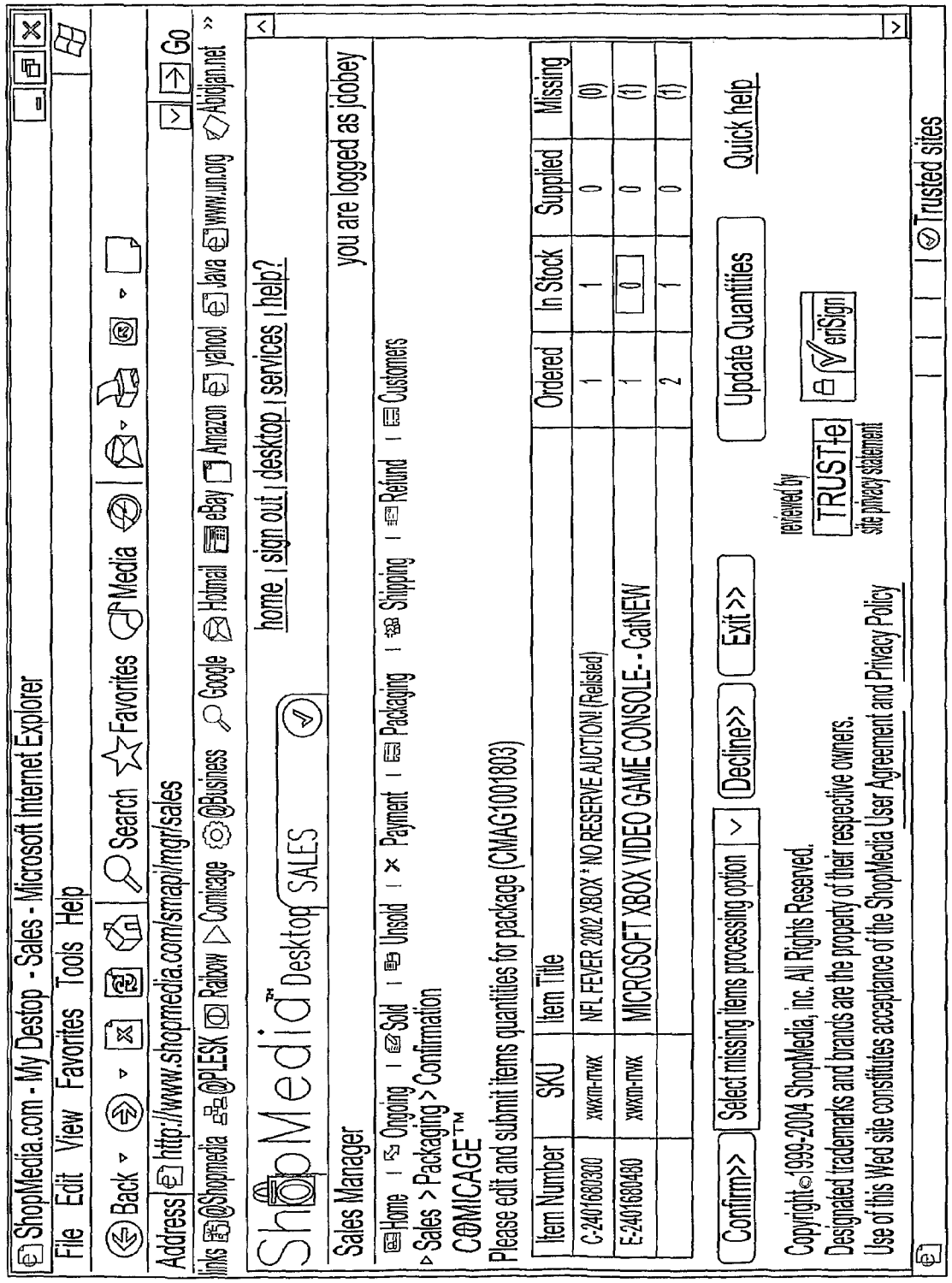
FIG. 9B is a screen display showing an example of goods availability editor generated by one embodiment of the present invention.
Figure 9C:
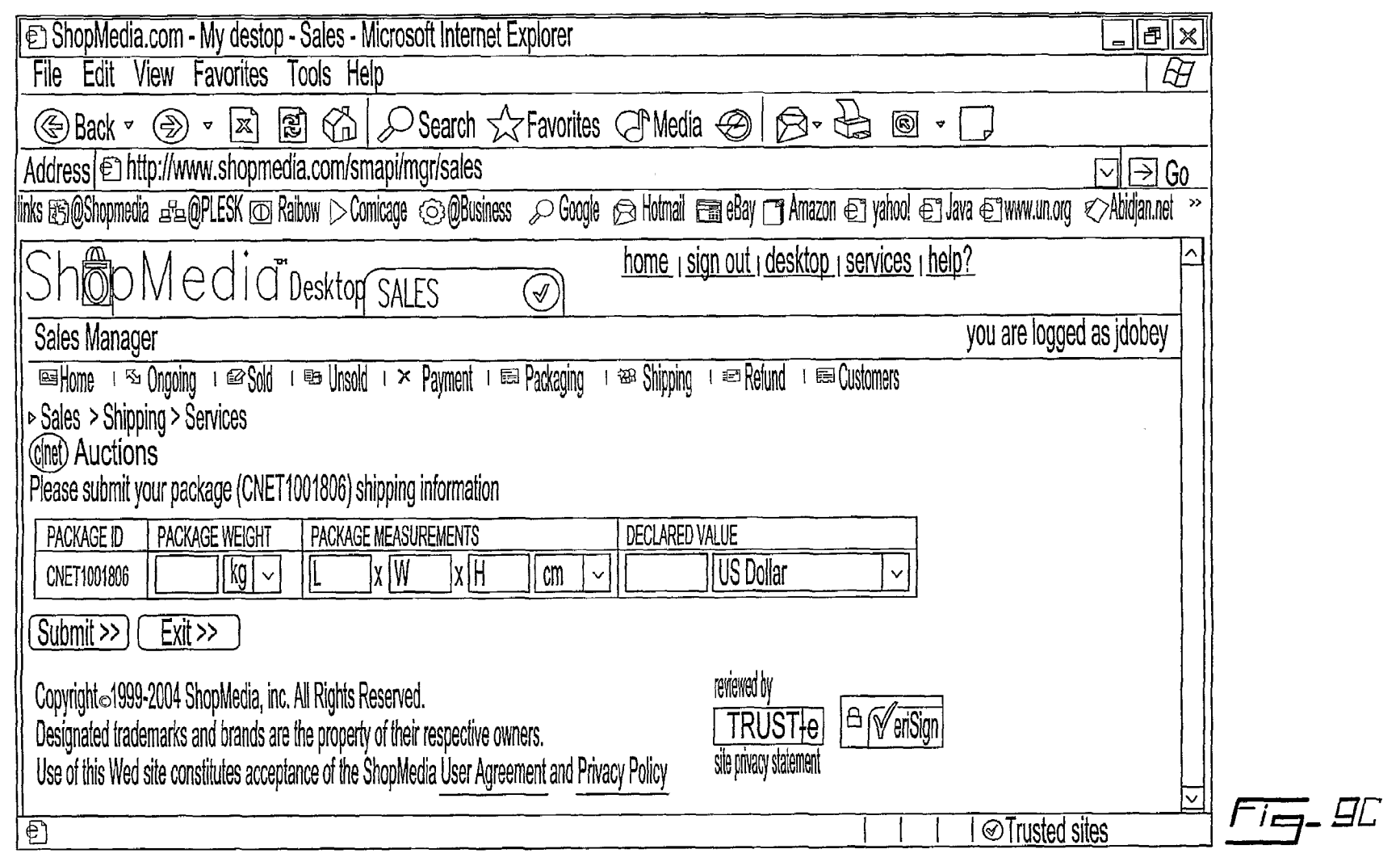

The packaging process is implemented by a computer program M03, referred to herein as the packaging manager that runs on the mediator's site M01. The packaging process will now be described with reference to FIG. 9A, which is a flowchart showing the interactions between the buyer, seller, and the packaging manager, as implemented in one embodiment of the present invention.

After the checkout process, the packaging manager will retrieve the newly generated orders from the order database M08, and then transmit these orders to the sellers from which the buyer has selected the goods. As is known in the art, the packaging manager automatically will generate and send an electronic message to each seller of goods. Typically, this electronic message comprises information and instructions about the orders placed with the seller of goods, such as the descriptions of the selected goods, the packaging timeframe (or deadline), as well as any other information and instructions pertaining to the processing of the order. Since the buyer may place more than one order with a seller, the packaging manager will preferably transmit a unique notification to each seller of goods, which notification will comprises the descriptions of all the orders placed by the buyer with the same seller. One benefit of such a feature is that it reduces the number of order notification messages sent to the seller, per buyer. On the other hand, this feature allows the seller to keep track of all orders placed by the same buyer. Otherwise, the packaging manager will have transmitted as many order notification messages to the seller as the total number of orders placed by the buyer with him. However, the packaging manager may send a notification per order placed by the seller, as the seller needs dictates. On the other hand, the seller may setup the packaging manager to send any order notification to his internal messaging account on the mediator's Web site M01, rather than sending these notifications to an external email address. One benefit of such a feature is that it allows the seller to centralize fulfillment operations of his business on the mediator's Web site M01. This way, the seller will only log onto the mediator's Web site M01 for any fulfillment tasks, rather than accessing a third party email service and then access (log onto) the mediator's Web site M01, each time he receives a new order notification. Such settings are more suited for individual sellers and small businesses, since larges businesses may prefer to redirect these order notifications to their own system.

Once a new order is transmitted to a seller, the packaging manager waits for the seller to complete the packaging of the goods (included within the order) and then confirm the package before the packaging deadline. The period of time between the date the order is transmitted to the seller and the deadline (for the seller) to confirm the packaged goods, is referred to herein as the "Packaging Timeframe". For example, if the seller is granted a packaging timeframe of 7 days, he must complete the packaging of the goods included within the order and then confirm the packaged goods within this timeframe. However, the seller may confirm the order (within this timeframe) or void it. The seller may also request an authorization for a partial order processing, depending on the availability of the goods included within the order. For example, if some goods are no longer available with the seller at the time the order notification is received, an approval will be requested from the buyer before allowing the seller to process any partial order, as discussed below.

Figure 7A:
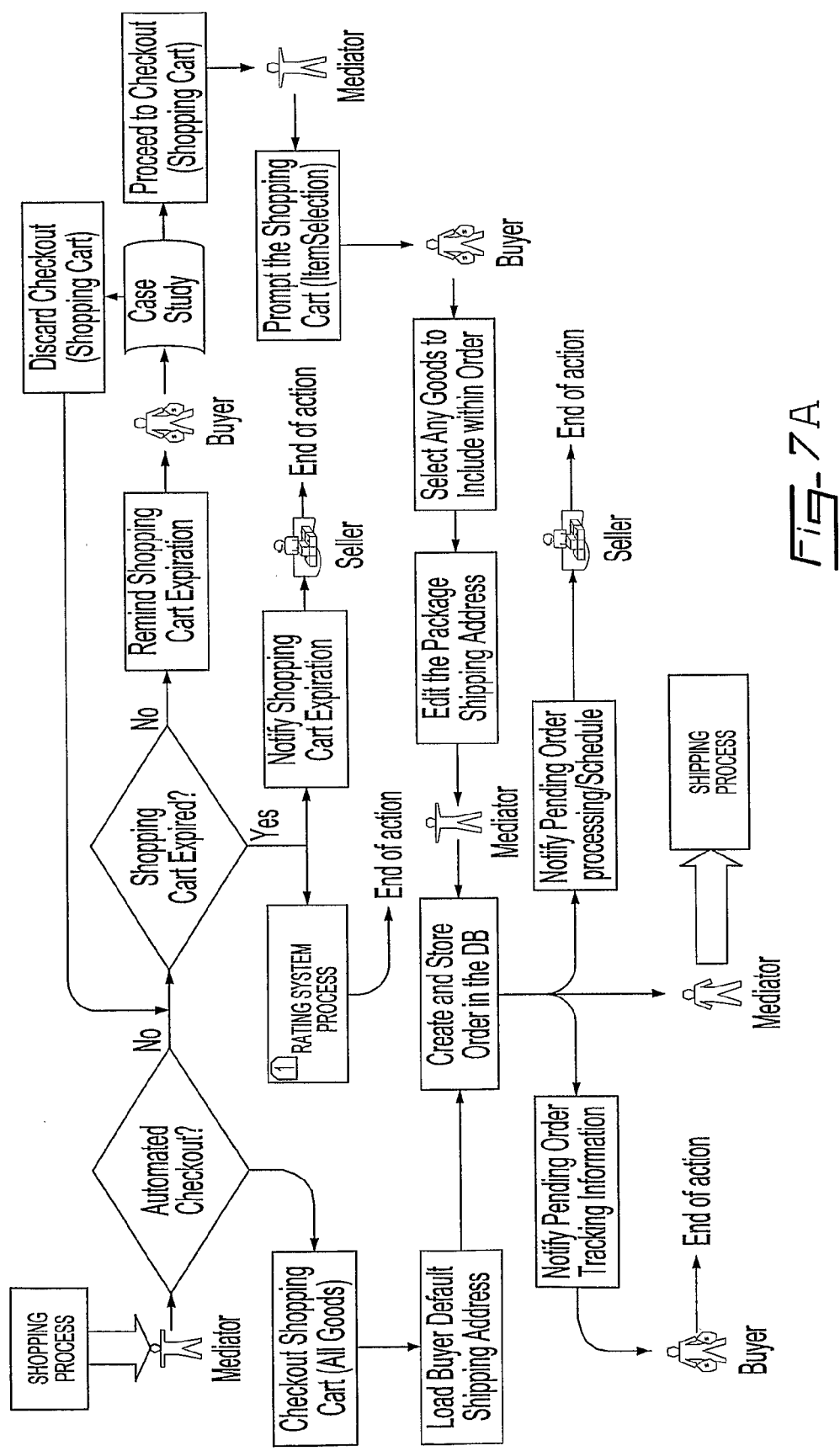
FIG. 7A is a flowchart illustrating the checkout process used in one embodiment of the present invention.

Since (some) goods included within an order may be unavailable (for example, the goods may be sold), the seller must provide the availability the goods included within the order. This is realized by enabling the seller to edit the available quantity of each item, as illustrated on FIG. 7A, which is a screen display of an editor of goods availability, as implemented in one embodiment of the present invention. With further reference to FIG. 7A, the seller must enter the quantity of the goods he plans to add into the package. Then the packaging manager will automatically derive the unavailable quantity of a given item by subtracting the ordered quantity from the available quantity provided by the seller, e.g. the quantity the seller plans to be added in the package. This way, if some items included within the order are no longer available with the seller, the packaging manager may notify the buyer, who may then take appropriate action, as discussed below. In an alternative embodiment, the seller may also be allowed to edit the quantity of the goods received (bought or expected) from potential suppliers, as shown on FIG. 7A. This type of quantity is referred to herein as "Supplied Quantity", conversely to the quantity of the goods available in stock that is referred to as the "Quantity in Stock". One benefit of this feature is that it allows the seller to effectively track goods (included within an order) that are supplied by a potential supplier through, while integrating the supply chain management of the seller to the packaging process. For example, the seller may use the mediator's Web site M01 to buy specific good (from others) that can be used for inventory update and/or processing pending orders during the packaging process.

As discussed above, the packaging manager will wait for the seller to confirm/void the order or request a partial order approval from the buyer, within the packaging timeframe. If a response is not received from the seller past the packaging deadline, the order will be automatically voided by the packaging manager, and the seller will be underrated by the customer rating system for the order cancellation, as discussed below. Then, the buyer will be contacted for the cancellation of his order, and he will be prompted for the refund of the ordered goods (if applicable).

In alternative embodiment, instead of voiding the order (in the case the seller is temporary unreachable), the packaging manager may grant an extra time (for example, a 48 hours grace period) to seller to process the order. Thus, the packaging process will be differed, and the packaging manager will wait for the seller to response the request within the grace period; if not the order will then be voided and a refund will be issued to the buyer (if applicable).

Furthermore, if the seller reaches a predefined number of voided orders, the packaging manager may also deactivate the seller's account and any subsequent goods selection from the seller's catalog will be disabled. However, the seller will be notified for his account deactivation, along with instructions (if he wishes to reactivate this account).

If the seller declines an order, he will be required to provide the reasons of the decline, which reasons will be communicated to the buyer. However, the seller will be underrated by the customer rating system for the order cancellation, as discussed below. Furthermore, a refund will be issued to the buyer for the goods (if applicable)

On the other hand, the seller may confirm a complete packaging, or he may request a partial order packaging approval from the buyer. For example, a partial order packaging approval will be required if some of the ordered goods are no longer available with the seller or these goods are back-ended at the time the seller receives the order.

If the seller confirms a complete order, e.g. when all the goods included within the order are available, the packaging manager will perform a test to verify whether or not the seller relinquishes his shipping operations to independent carrier (registered on the mediator's Web site M01). For example, the packaging manager may retrieve the seller's preferred shipping procedure by accessing the customer database M05 on the mediator's Web site M01.

If the seller hands over his shipping operation to independent carriers, he will be required to provide the package characteristics that will be used during another process to computing the shipping options available for these independent carriers. Typically, the required package characteristics include the parcel weight and dimensions (width, length, and height). The packaging manager will record this information and store it in the order database M08. Then, the package will be forwarded to the shipping process, as discussed below.

If the seller does not relinquish his shipping operation, the packaging manager will also perform a test to verify if the seller uses the mediator as a clearinghouse, in which case the packaging manager will cooperate with the billing system to collect payment from buyer for the goods purchased from the seller. Otherwise, the whole transaction will come to an end.

If some goods are temporarily back-ended or no longer available with the seller, he may requests a partial order processing (e.g. partial packaging). Typically, the partial order processing request will include the reasons of incomplete order. In some case, this request may also include the timeframe required for back-end goods to be available, as provided by the seller of goods. For example, the seller may ask for an extra time to complete the packaging of the goods, if he expects these goods to be available in a near future (for example, within days, weeks, months, etc.).

The packaging manager will then put the packaging process in standby with a notification to the seller, along with a warning not to sell the available goods while waiting for the buyer permission. The packaging manager will then forward the partial order authorization request to the buyer, on behalf the seller. The packaging process will be deferred until a response is received from the buyer.

Preferably, the packaging manager will wait for the buyer to response to the request within a predefined period of time, which is referred to herein as partial order authorization timeframe. If a response is not received from the buyer past this timeframe (for example, a week), the packaging manager will contact the seller of goods to either cancel, or keep on waiting for the buyer authorization. However, if the seller chose to cancel the order, he will be underrated by the customer rating system for the order cancellation, e.g. for unavailable goods registered for sale. Then, the seller will be notified for the penalty order cancellation, and the buyer will be contacted for the refund of the ordered goods (if applicable).

When the buyer receives an authorization request for a partial order processing, he may choose from several options. For example, the buyer may choose to cancel the entire package (depending on the seller's policies), cancel any unavailable goods, ship available items within a shipment and ship those missing within another (when available), or just extend the packaging process timeframe until all the missing items are available to ship them within a unique package, which may be either to authorize a partial order or cancel the entire order. Preferably, the buyer will be prompted to click on a link embedded within the electronic mail to select his preferred choice. In alternative embodiment, the buyer will be provided with a link to a section of the mediator's Web site M01 that he may access and perform these tasks. Based on the buyer choice, the packaging manager will perform a test to find out whether or not the buyer approved a partial order processing, as requested by the seller. Then, the seller will be contacted by the packaging manager with the buyer approval/denial of a partial order processing.

If the buyer denies a partial order processing authorization to the seller, by choosing to cancel the entire package (depending on the seller policies), a full refund will be issued to him (if applicable). However, the seller will be underrated by the customer rating system for unavailable goods registered for sale, as discussed below. The seller will be kept informed about the buyer decision via an email notification.

On the other hand, if the buyer authorizes the seller to proceed with a partial order packaging, the packaging manager will perform a test to validate the buyer's preferred partial order processing. For example, the buyer may choose to wait for back-ended goods to be available to receive a unique shipment. The buyer may also choose to include the all the goods available with the seller within a shipment, and then ship the back-ended goods (within another shipment) when they become available. In the later case, rather than waiting for the back-end goods to be available, the buyer may choose to cancel any unavailable goods and then request to be refunded for these items (if applicable). Based on the partial order packaging approval provided by the buyer, the packaging manager will automatically make the necessary changes (in the order database M08) to reflect the buyer choice, as discussed below.

For example, if the buyer chooses to wait for all the back-ended goods to be available with the seller, in order to receive a unique shipment, the packaging manager will extend the packaging process deadline of the order, by adding the partial order processing timeframe that was requested by the seller to compete the packaging of the back-ended goods. However, if the buyer chooses to receive the goods actually available with the seller and either ship the back-ended goods later (when they become available) or cancel any unavailable goods, the packaging manager will split the original order into two shipments. More specifically, the packaging manager will automatically remove any unavailable goods from the original order, and then include these items within a new order. Subsequently, the packaging manager will initiate a new packaging process for the order that includes the back-ended goods. However, the packaging timeframe of this back-end order will be equal to the partial order processing timeframe, granted to the seller to complete the packaging of the back-ended goods. Thus, the original order will appears as a complete package, while none of the goods included within the generated order will be available with the seller. Both, e.g. the new and original, orders will be kept on the packaging process for the seller to process them. More specifically, the seller will have to confirm the original order since all the goods within this order are available. However, the new order, which includes the back-end goods, will be processed (as discussed above). On the other hand, if the buyer has chosen to cancel the back-end order, these items will be refunded to the buyer; in the case he has already issued a payment for these goods.

In the preferred embodiment, the confirmation of the goods availability may be automated, rather than manually confirming the availability of the goods included within the order. Hence, this is realized by allowing the seller of goods to "instruct" the packaging manager to automatically confirm the availability of any item included within the order, which action may be enabled by the seller during a previous profile management session. Indeed, a manual confirmation is required from the seller of goods because the availability of the items included within the order is unknown to the packaging manager, at the time the order is transmitted to the seller. Thus, by enabling this feature, the packaging manager will not wait for a confirmation from the seller of goods. The packaging manager will assume that all the ordered goods are available with the seller, and that he will always be able to fulfill a complete order. Thus, if the order auto-confirmation is enabled, no partial order packaging will occur.

As discussed above, the package characteristics are required from the sellers who relinquish their shipping operations to independent carriers, since this information is needed to compute the shipping options/costs that may be available (with these carriers) for the delivery of the orders placed such sellers. In an alternative embodiment, the package characteristics can be automatically estimated (e.g. predicted) based on the individual characteristics of the goods included within the shipment. Indeed, if the physical characteristics (e.g. weight and dimensions) of the goods to be included within a shipment are known, the package characteristics can be estimated as the summation of the characteristics of each item included within the shipment. For example, if a shipment contains 10 books, and each book weights 2 Kg and has a volume of 500 $cm^3$ (10 cm×10 cm×5 cm), then the package that may contains these books may have (at least) a volume of 5000 $cm^3$ and a weight of 20 Kg. Preferably, the characteristics of each goods will be provided by the seller during the listing process, e.g. when the seller registers the goods for sale on the mediator's Web site M01. If the characteristics of (at least one of) the goods is unknown at the time of the order confirmation, the packaging manager will automatically prompt the seller (who relinquishes his shipping operations) to provide the characteristics of the overall shipment, as discussed above. On the other hand, such a seller may choose to always be prompted (by the packaging manager) to manually provide the package characteristics, even in the case the package characteristics may be predicted, as discussed above.

The order auto-confirmation option is available to any seller of goods, whether or not they relinquish their shipping operations to independent carriers. However, if a seller relinquishes his shipping operations, he will be required to manually provide the characteristics of any package to be handled by a potential carrier, since such characteristics are needed to compute the shipping options available from these carriers, as discussed above. Thus, the packaging manager will perform a validation test (before transmitting the order notification) to find out if the seller relinquishes his shipping operation. Hence, if such a seller uses the order auto-confirmation feature, he will be requested (via an email notification) to provide the characteristics of the package, unless these characteristics may be computed based on those the goods included within this shipment, as discussed above.

In the preferred embodiment, when a seller who do not relinquishes his shipping operations, but uses the order auto-confirmation feature, the order processing software will automatically prompt the buyer to provide a payment for the purchased goods, only if the seller uses the mediator as a clearinghouse. Otherwise, the mediator will not collect payments from the buyer on behalf the seller, but rather rely on the seller to handle this operation.

The buyer may also "instruct" the packaging manager to automatically grant or deny a partial order processing authorization to the seller of goods, if some goods are not available with the seller. Preferably, this choice will be made by buyer during a profile management session. For example, the buyer may set the packaging manager to always deny a partial order processing authorization to the seller, in which case the packaging manager will not allow the seller to request such an authorization from the buyer, but rather prompt the seller to decline the order if some of the ordered goods are not available. On the other hand, the buyer may set the packaging manager to automatically grant a partial order processing to the seller who requests it. If the buyer pre-authorizes a partial order processing, he will also need to choose one of the preferred partial order processing procedures discussed above. Thus, when the seller request partial order processing authorization from the buyer, rather than forwarding the request to the buyer, the packaging manager will goes through the customer database M05 (using the buyer ID included with the order) to retrieve the buyer's preferred partial order processing status. If a preferred partial order processing was not previously specified by the buyer, the packaging manager will then forward the request the buyer.

Once an order is confirmed, the packaging manager will store this information into the order database M08. Then, the packaging manager will initiate the shipping process, which is discussed in detail below. In the preferred embodiment, this is realized by changing the status of the order process to "Shipping".

8. Order Shipping Function

As discussed above, when a seller relinquishes his shipping operations to independent carriers, he must provide the mediator with the characteristics of the package that contains goods to be shipped. As discussed below, the package characteristics are used during the shipping process to compute the shipping options available, from the independent carriers registered with the mediator, for the delivery of the goods. Typically, the package characteristics include the weight and dimensions (width, length, and height) of the shipment. As also discussed above, the package that are handled during the shipping process will only be from those sellers who relinquish their shipping operations, while the other sellers (who do not relinquish their shipping tasks) will handle the shipping of any orders placed with them.

The shipping process is implemented by a computer program M03, referred to herein as shipping manager that runs on the mediator's Web site M01. The shopping process will now be described with reference to FIG. 10A, which is a flowchart showing the interactions between the buyer, seller, carrier, and the shipping manager, as implemented in one embodiment of the present invention.

The shipping manager computes the shipping options based on the physical characteristics (weight and dimensions), departure (seller location) and destination (buyer location) of the package. More specifically, the shipping manager will use this information to parse the shipping database M07 on the mediator's Web site M01, and/or it may interact with other resources located on a carrier' Web site C04. For example, the shipping manager may cooperate with a third party computer program C06 (running on the carrier's Web site C04). The shipping manager may also retrieve information from a data repository (such as XML documents C07 and/or databases C08) located on the carrier's Web site C04, either directly or via a dedicated computer program C04. In an alternative embodiment, this information may be supplemented by predefined criteria (provided by the buyer) to filter out the shipping options available from potential carriers, in which case only the shipping options that match the buyer criteria are computed. For example, the buyer may choose to include a shipping price range, a preferred timeframe, a rating level of the carrier, or any other criteria that may assist the buyer to select a shipping method that suits his needs.

As is known in the art, postal codes are used by shipping companies (e.g. postal services) around the world to convey a parcel to its destination. Postal services divide a country into geographic regions, with a unique code assigned to each region. For example, "ZIP code" is the term for a postal code used by portal services in the United States. The shipping manager will require postal codes (or ZIP) to accurately calculate shipping rates for many countries. This is the case for some countries, such as the United States, Canada and the United Kingdom, from/to which the shipping manager cannot calculate the correct rate without a postal code. Thus, the shipping manager will always require a postal code for any shipment from/to these countries.

After computing the shipping options available from various carriers, the shipping manager will present the buyer with the results to choose from. Any notification procedure can be used to prompt the buyer with these shipping options. In the preferred embodiment, the shipping manager generates an email (comprising the computed shipping options) and transmits it to the buyer. In an alternative embodiment, instead of transmitting the actual shipping options to the buyer, the shipping manager may generate an email that only include links to resources/sections of the mediator's Web site M01, which location may be accessed by the buyer to perform these tasks.

Once the buyer receives the shipping options, he must select his preferred shipping method, which will subsequently be used by the selected carrier to deliver the goods (package) purchase from the seller. For example, the buyer may select a delivery method from a potential carrier, either to reduce shipping freight, to benefit from special feature/offering, for trust and/or loyalty, or for any other particular reasons. FIG. 10B is a screen display illustrating the shipping options computed for a potential package, as implemented in one embodiment of the present invention. With reference to FIG. 10B, a given description of a shipping option may include, for example, the name of the carrier (company), service name (delivery method), the shipping cost, and the estimated arrival of the shipment. In an alternative embodiment, the description of the shipping option may package delivery timeframe, as well as other information that may assist the buyer in the selection of a delivery method that suits his needs. With further reference to FIG. 10B, the buyer may also select a preferred period of the day for the package to be delivered. For example, if the buyer (or the potential recipient) is more likely to be present at home in the afternoon, he may choose so. Additionally, the buyer may also specify a preferred declared value (amount) of his package. If not, the shipping manager will automatically record the value amount of the purchased goods as the package declared default value.

Figure 10A:
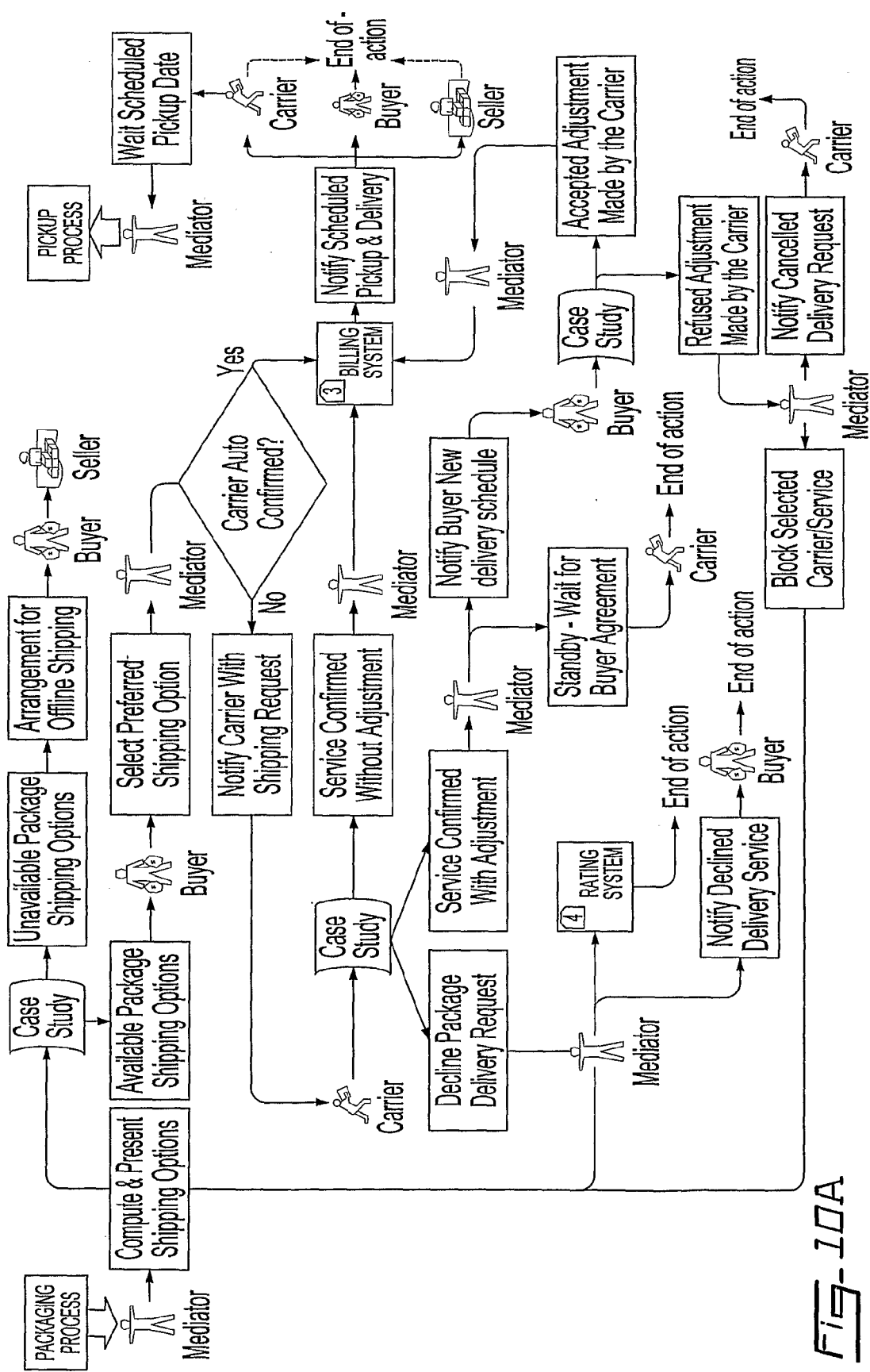
FIG. 10A is a flowchart illustrating the shipping process used in one embodiment of the present invention.

With reference to FIG. 10A, if no shipping option is available from independent carriers, the shipping manager will identify the buyer to the seller to permit both parties to arrange the shipping of the package, offline. In an alternative embodiment, the buyer may be allowed to cancel any "unshippable" package, in which case the buyer will be refunded (if applicable).

When a buyer selects the shipping method of his package, the shipping manager will automatically generate and send an email to the carrier, whose delivery method was selected by the buyer. Such settings may be carried out by the seller during a profile management session. Such a service request, openly made by the buyer to the carrier for the delivery of his order placed with the seller of goods, is referred to herein as "Carrier on Demand", "Shipping on Demand", or "Delivery on Demand". The service request email typically comprises information such as the package scheduled pickup date, pickup address (seller location), parcel destination address (buyer location), goods descriptions, package weight and dimensions, the delivery service name and timeframe, the estimated shipping charges. However, this information may also include any other instructions about the package shipping process, such as the package pickup time (e.g. preferred period of the day) as provided by the seller of goods. For example, the seller can specify the preferred period of day (morning, afternoon, etc.) and/or the days of the week, he will be available for any package pickup by a potential carrier.

Based on the information included within the shipping request email, the carrier must either accept to deliver the package or decline the service. The carrier may also adjust the estimated shipping cost (if not accurate) and/or modify the pickup/delivery schedules, in which case the buyer will have to either agree with these adjustments or decide to select another shipping method from any other carriers, as discussed below.

The shipping manager will wait for the carrier to confirm/void the delivery request within the predefined timeframe, referred to herein as "shipping timeframe". If a response is not received from the carrier past the shipping deadline, the shipping request will be automatically voided by the shipping manager, and the carrier will be underrated by the customer rating system for declining the buyer delivery request. The buyer will also be contacted for the denial, and the shipping manager will initiate a new shipping process by prompting the buyer will the shipping options available for his package delivery.

If the carrier declines the requested delivery service, he will be required to provide the reasons of this decline, which reasons will be communicated to the buyer. However, the carrier will be underrated by the customer rating system for refusing the service to the buyer, as discussed below. Then, the shipping manager will initiate a new shipping process and prompt the buyer with the shipping options available for the delivery of his package. Preferably, these newly computed shipping options will not include the carrier who previously declined the service to the buyer. However, in an alternative implementation, the shipping manager may only discard the shipping service that was previously declined by the carrier. The shipping process will go forward only if a carrier accepts to the shipping request made by the buyer, or if the shipping manager initiates a special procedure for the delivery of the package (as discussed in the case of an "unshippable" package).

If the carrier adjusts the shipping cost or modifies the pickup/delivery schedule, the shipping manager will contact buyer to learn whether or not he agrees with the adjustments made by the carrier. The shipping manager will put the shipping process in standby with a notification to the carrier, along with a warning not to pickup the package from the seller location while waiting for the buyer approval. The shipping manager will then forward the shipping adjustments request to the buyer. Typically, the shipping adjustment approval request includes the modifications made by the carrier in the shipping cost, and/or the pickup/delivery schedule. The shipping process will be deferred until a response is received from the buyer. Preferably, the shipping manager will wait for the buyer to response to the request within a predefined period of time, which is referred to herein as shipping adjustment approval timeframe. If a response is not received from the buyer past this timeframe (for example, a week), the shipping manager will contact the carrier of goods to either cancel, or keep on waiting for the buyer approval. However, if the carrier chose to decline the service, he will be underrated by the customer rating system for refusing the service to the buyer. The buyer will also be contacted for the refund of the shipping freights (if applicable).

When the buyer receives a shipping adjustments approval request, he may accept or disprove the modifications made by the carrier. Preferably, the buyer will be prompted to click on a link embedded within the email to make his choice. In alternative embodiment, the buyer will be provided with a link to a section of the mediator's Web site M01 that he may access and perform these tasks. If the buyer accepts the new delivery schedule, the shipping manager will notify both seller and carrier with the pickup and delivery schedules, and the shipping process will resume. However, if the buyer refuses the shipping adjustments made by the carrier, he will be prompted with new shipping options (available for his package) to choose from. However, the carrier will be underrated by the customer rating system, depending on the extent of the adjustments made by the carrier. For example, if the carrier has dramatically changed the planned pickup/delivery schedule or the shipping cost, he may be penalized for that if it is proved that these changes was intended to encourage the buyer to refuse the service. The shipping manager will then initiate a new shipping process and the carrier (whose adjustments were rejected by the buyer) will be notified for the cancellation of the delivery request.

In the preferred embodiment, the confirmation of delivery request (by the carrier) may be automated. This is realized by allowing the carrier to "instruct" the shipping manager to automatically confirm any incoming delivery request, which feature may be enabled by the carrier during a previous profile management session. Thus, by enabling delivery request auto-confirmation option, the shipping manager will not wait for a confirmation from the carrier. Instead, the shipping manager will assume that the carrier will always be able to handle the package delivery, with the estimated shipping cost and the planned pickup and delivery schedules. The shipping request auto-confirmation feature is available to any carrier. However, while local shipping may be auto-confirmed, carriers will be required to manually confirm foreign delivery request to provide any duties and broker fees that are unknown to the shipping manager, unless no extra fees apply. On the other hand, a carrier may choose to always be prompted (by the shipping manager) to manually confirm the delivery request, and then verify the estimated shipping cost, pickup/delivery schedule, as well as providing any duties/custom fees.

The buyer may also "instruct" the shipping manager to automatically accepts or refuse any potential changes that may be performed by a carrier. Preferably, this choice will be made by buyer during a profile management session. For example, the buyer may set the shipping manager to always deny any increase in the shipping freights and/or pickup/delivery timeframe. In this case the shipping manager will not allow the carrier to make such adjustments, but it will prompt the seller to rather decline the shipping request. On the other hand, the buyer may set the shipping manager to automatically accept any increase in the shipping freights and/or the pickup/delivery timeframe that below a given percentage (for example, 25% or 50%). This way, when the carrier adjusts the shipping freights and/or the pickup/delivery schedule, rather than forwarding the shipping adjustments approval request to the buyer, the shipping manager will goes through the customer database M05 to retrieve the buyer's shipping adjustments approval/denial. If an approval/denial was not previously specified by the buyer, the shipping manager will forward the shipping adjustments approval request the buyer, as discussed above.

If an agreement is reached between the carrier and the buyer for the package delivery, the shipping manager will cooperate with the billing system, which will then prompt the buyer to enter a payment for the goods purchased with the seller and/or for the shipping freight associated to the package delivery. However, the billing system will collect payment from the buyer only if the seller and/or carrier use the mediator as a clearinghouse, as discussed below. The shipping process will only resume if the billing scheme is successfully.

Subsequently, the seller, carrier and buyer will be notifies with instructions and information about the pickup and delivery process, as planned by the shipping manager. More specifically, the shipping manager will automatically generates and send an email to the package seller. In the preferred implementation, the email includes information, such as the scheduled package pickup date, the identity of the carrier who must pickup the package, as well as any other instructions relevant to the pickup procedure. For example, the email may also include a downloadable version custom forms that need to be filled by the seller and then be provided to the carrier at the time of the package pickup.

On the other hand, the buyer will be able to track the package with the seller, before the package pickup, and with the carrier, after the pickup is completed. Any package will be tracked via the mediator's Web site. However, if the carrier has a Web site C04, the buyer may also track the package through this site. For example, the buyer may be redirected to the carrier's Web site C04 by clicking a hyperlink from the mediator's Web site M01. The buyer may also directly access the carrier's Web site C04 for tracking purposes. The carrier will wait until the scheduled pickup date to visit the seller.

9. Order Pickup Function

The pickup process takes over when the shipping process is completed. During the shipping process, the shipping manager computes and transmits the package pickup/delivery schedule to the seller, buyer and carrier, as discussed above. The carrier will wait until the pickup date to take the package from the seller.

Figure 11:
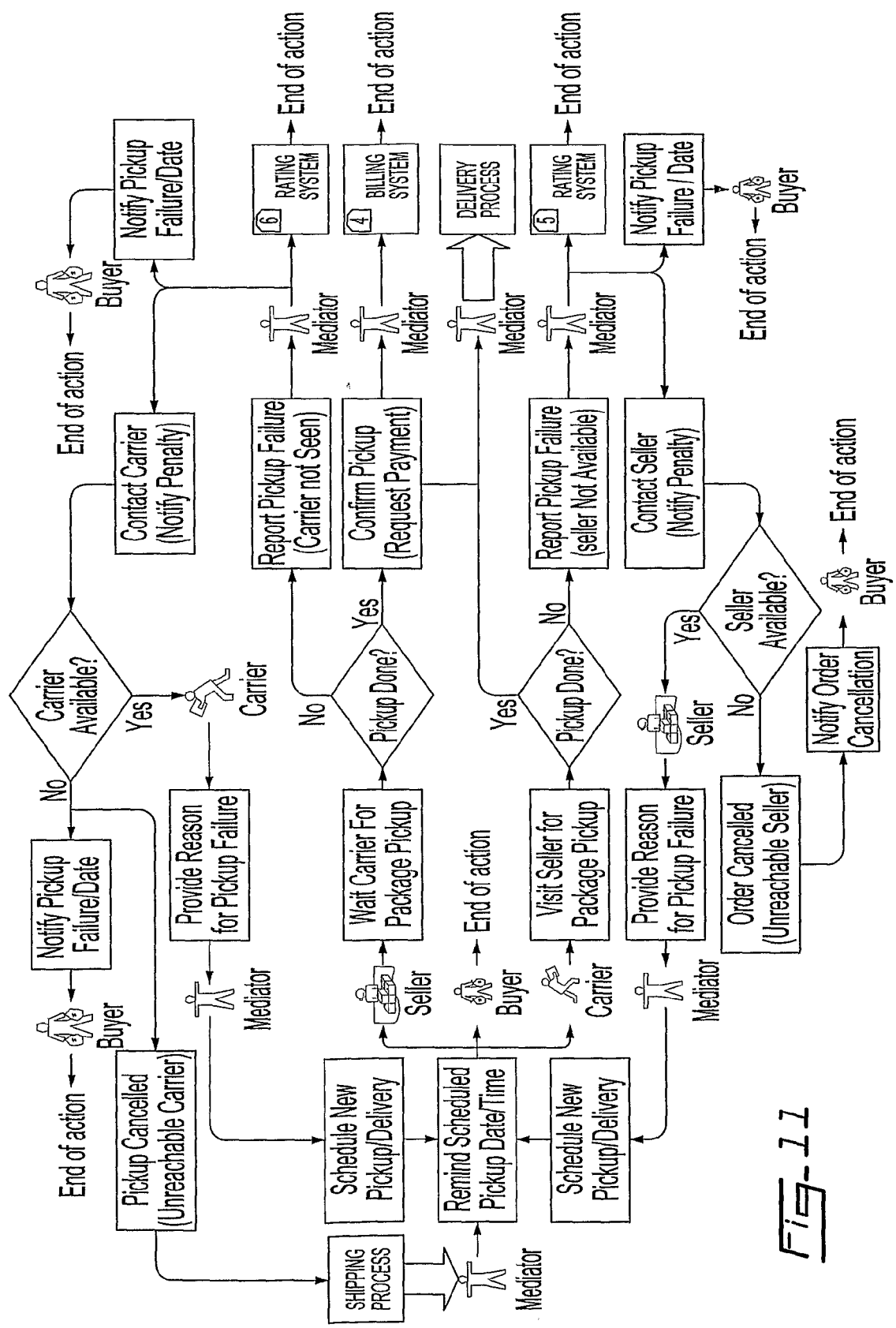
FIG. 11 is a flowchart illustrating the pickup process used in one embodiment of the present invention.

The pickup process is implemented by a computer program M03, referred to herein as pickup manager that runs on the mediator's Web site M01. The pickup will now be described with reference to FIG. 11, which is a flowchart illustrating the interactions between the buyer, seller, carrier, and the pickup manager, as implemented in one embodiment of the present invention.

In the preferred implementation, the pickup manager will generate and send an email reminder to all parties regarding the package pickup, for example 48 hours before the scheduled pickup date. When the carrier goes to the seller's location (for example, a store, warehouse or home) to pickup the package, the seller must also provide him with any shipping forms pertaining to the package delivery.

After the carrier visit, the seller must confirm the actual date the package was taken by the carrier. In an alternative embodiment, the pickup confirmation may be done by the carrier. In both case, the pickup manager will perform a test to validate whether or not the pickup was completed as planned.

Upon receiving a pickup confirming from the carrier, the pickup manager will cooperate with the billing system to credit the seller for the goods sold. However, such a credit will be issued to the seller's account only if he uses the mediator as a clearinghouse. Otherwise the buyer and seller will have to communicate, through the mediator' Web site M01 or a third party site, for payment arrangement, as discussed below.

If the package pickup fails because the carrier does not show up at the seller location, the seller must report this failure to the pickup manager. However, if the package pickup fails because the seller is unreachable (e.g. not found) the scheduled date of the package pickup, the carrier must report such a situation to the pickup manager. In both cases, the pickup manager will contact the negligent party, which will be requested to provide the reasons of the pickup failure. Then, the pickup manager will notify the buyer regarding the pickup failure, along with the reasons provided by the negligent party.

If the negligent party responds to the pickup failure email, and then authorizes the pickup process to go forward, the pickup manager will schedule and transmit a new pickup/delivery schedule to all parties involved. Furthermore, the pickup manager will cooperate with the customer rating system to underrate the negligent party for the pickup failure, as discussed below.

However, if there is no response (from the negligent party) to the pickup failure email sent by the pickup manager, the ongoing pickup process will be cancelled, and the buyer will be notified for this cancellation.

Furthermore, the customer rating system will penalize the negligent party for the pickup cancellation. If the unreachable (negligent) party is the carrier, the pickup manager will cooperate with the shipping manager, which will initiate a new shipping process to allow the buyer to select another carrier, e.g. a new delivery method for his package. However, if the negligent party is the seller of good, the entire transaction will come to an end, along with the cancellation of the order placed by the buyer. Furthermore, the pickup manager will contact the buyer for a refund (if applicable).

10. Order Delivery Function

Figure 12:
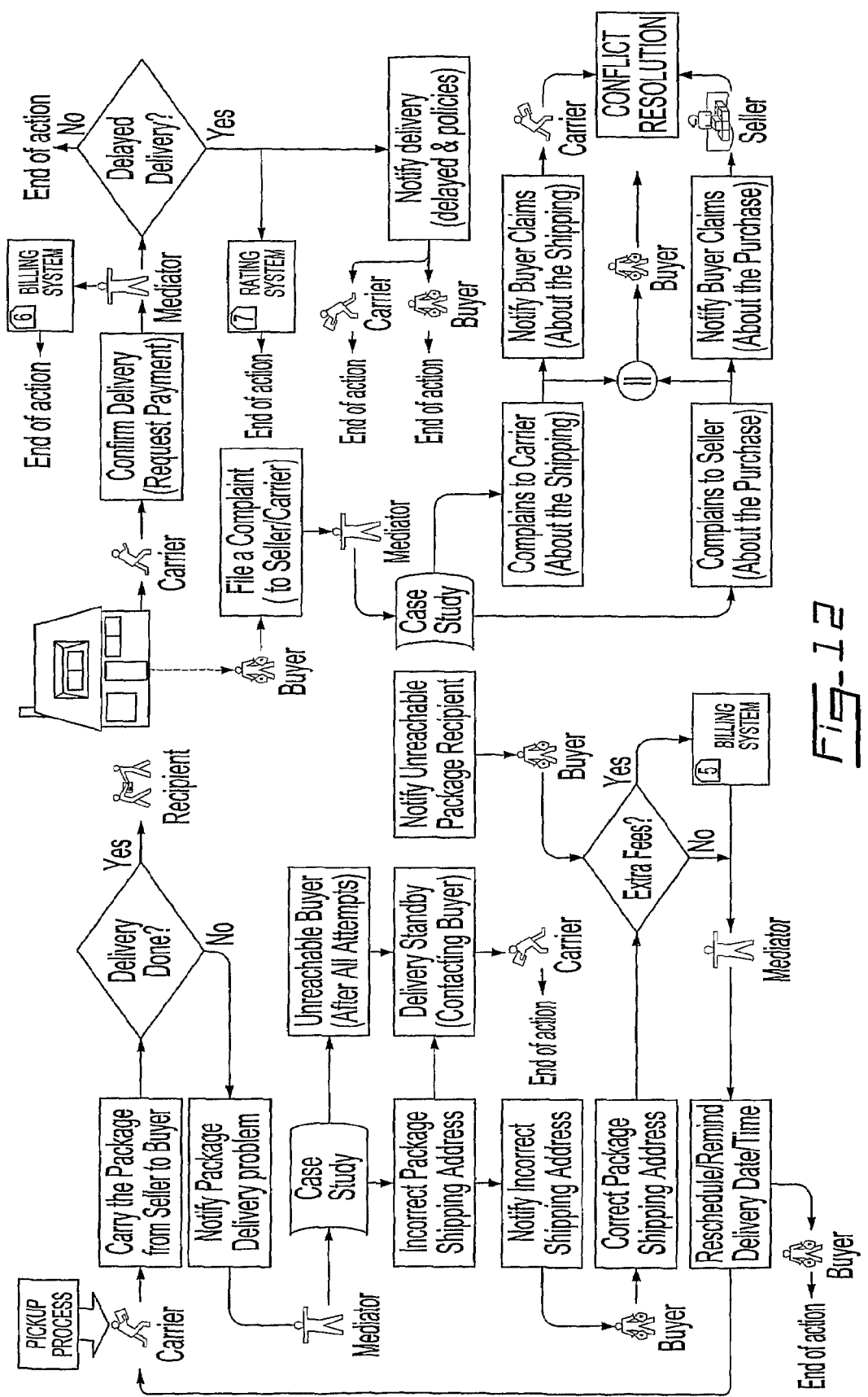
FIG. 12 is a flowchart illustrating the delivery process used in one embodiment of the present invention.

Once the carrier pickups the package from the seller's location, he will be in charge of delivering it to the buyer. The package delivery process is implemented by a computer program M03, referred to herein as delivery manager that runs on the mediator's Web site M01. The delivery process will now be described with reference to FIG. 12, which is a flowchart illustrating the interactions between the buyer, seller, carrier, and the delivery manager, as implemented in one embodiment of the present invention.

In the preferred implementation, the delivery manager will generate and send an email notification to the buyer regarding the package delivery, for example 24 hours before the scheduled date. During the delivery process, the carrier must report any problem to the delivery manager. This way, appropriated actions may be taken to deal with the issue. For example, if the carrier is unable to get the package delivered, because the buyer (or the package recipient) is unreachable or if the carrier discerned that the address is incorrect, he must report such an issue to the delivery manager. Then, the carrier will be placed on standby, and the delivery manager will try to contact the buyer regarding the delivery failure.

If the buyer is reached by the delivery manager after the delivery failure, he will be prompted to modify any incorrect address. However, if the delivery fails because the seller was not present at the time of the package delivery, he will have to agree with the new delivery date scheduled by the carrier, if he wants his package to be delivered. However, the buyer will be billed and charged for any extra shipping fees for the new delivery attempt. Preferably, the delivery manager will notify the buyer of the extra fees that apply within the delivery failure notification. If the buyer agrees to pay for the extra shipping fees, he will be redirected to the billing system for the payment of these fees. However, if the buyer declines the extra shipping fees, a special procedure will be initiated. For example, the whole transaction may be differed, and then the delivery manager will initiate a conflict resolution procedure. In an alternative embodiment, the carrier and buyer may be encouraged to handle the situation without involving the mediator. If the buyer is unreachable (after all the attempts), the delivery manager may return the package to the seller and the buyer will be charged for any the shipping freights (if possible).

Once the package is delivered, the carrier must confirm the actual date the package was dropped to the buyer's location. In an alternative embodiment, the package delivery confirmation may be done by the buyer, after receiving it. In both case, the delivery manager will perform a test to validate whether or not the delivery was completed as planned, e.g. without any delay. Upon receiving the package delivery confirming, the delivery manager will cooperate with the billing system to credit the carrier for the shipping freights. However, such a credit will be issued to the carrier's account only if he uses the mediator as a clearinghouse. Otherwise the buyer and carrier will have to communicate, through the mediator' Web site M01 or a third party site, for payment arrangement, as discussed below.

If the package was not delivered as planned, e.g. if the delivery date has been altered, the carrier must acknowledge it to the delivery manager by providing the exact delivery date. The customer rating system will then penalize the carrier for the delayed package delivery delay or lateness. However, if the carrier does not acknowledge such a delivery date alteration, the buyer may do so by reviewing the arrival date provided by the carrier, in which case a more severe penalty will be applied to the carrier for trying to mislead the delivery manager.

After the package delivery, the buyer may complain to the seller regarding the ordered goods, in which case the complaint will be forwarded to the seller of goods. For example, the buyer may file a complaint for misleading goods purchased from a seller. On the other hand, the buyer may also complain to the carrier about the delivery of his package, after (or before) the arrival of his parcel. For example, such a complaint may be filed for broken goods, if he suspects that the goods were damaged during the delivery process. In the preferred embodiment, the buyer must file such as claim via the mediator's Web site M01. This way, the delivery manager will contact the seller and/or carrier to resolve the conflict. Furthermore, the delivery manager will cooperate with the customer rating system to record and rate the seller or carrier, based on the outcome of the conflict resolution. In the interim, e.g. if the buyer is not the actual recipient, the recipient must communicate with the buyer, who may then file the claim through the mediator's Web site M01. In the preferred embodiment, the conflict resolution will be handled within a separate process, either online or offline.

11. Account Billing and Collection

As discussed above, the mediator's Web site M01 includes a billing system that automatically charge and collect payments from buyers for any purchased goods and/or services. For example, buyers will be charged for goods purchased from the seller, and for the shipping freight associated to delivering these goods by the carrier.

Figure 13A:
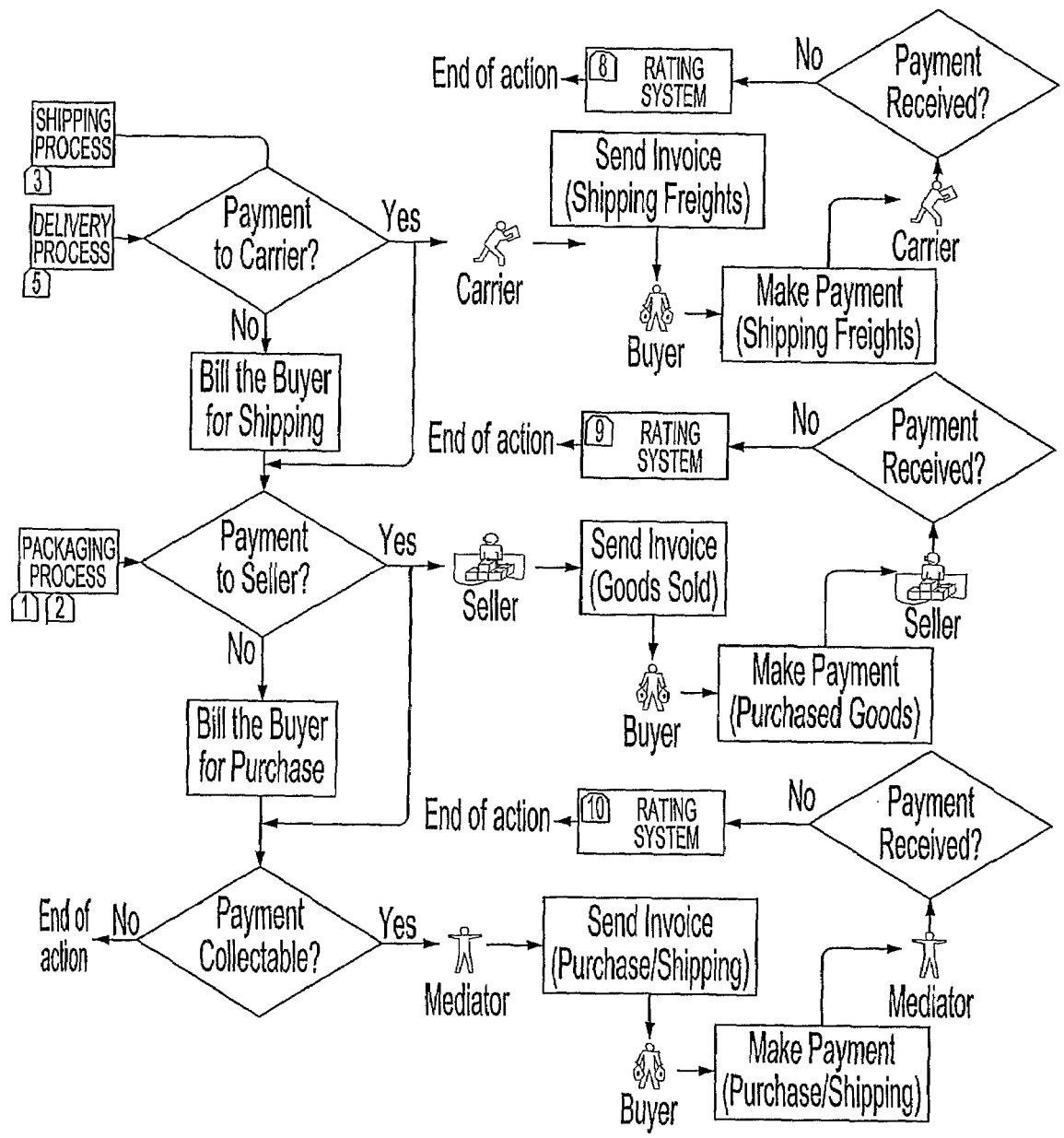
FIG. 13A is a flowchart illustrating the billing process used in one embodiment of the present invention.

The billing system is implemented by a computer program M03, referred to herein as the customer billing software that runs on the mediator's Web site M01. The billing system will now be described with reference to FIG. 13A, which is a flowchart illustrating the interactions between the buyer, seller, carrier, and the billing software, as implemented in one embodiment of the present invention.

With reference to FIG. 13 A, the billing system is accessed via several modules, which include the packaging, pickup, shipping, and delivery processes. A payment will be requested from the buyer, for example, during the packaging, shipping and/or the delivery process. More specifically, the billing system will actually be initiated during the packaging process (by the packaging manager), if the seller handles the shipping of any order placed by the buyer, in which case the billing system will perform a test to validate whether or not the seller uses the mediator as a clearinghouse, e.g. if the buyer pays the mediator for the purchased goods. However, the billing system will be initiated (by the shipping manager) during the shipping process if the seller of goods relinquishes his shipping operations to independent carriers, in which case the billing system will perform a test to validate whether or not the carrier uses the mediator as a clearinghouse, e.g. if the buyer pays the mediator for the shipping freights associated to delivering his package. Furthermore, the billing system may also be initiated during the delivery process (by the delivery manager) to collect the payment of any extra shipping fees from the buyer, as discussed above. The billing system will directly collect shipping freights only if the carrier uses the mediator as a clearinghouse. On another hand, the billing system will also collect payment from the buyer for the purchased goods only if the seller uses the mediator as a clearinghouse. Otherwise, the seller and carrier will have to directly communicate with the buyer, through the mediator' Web site M01 or a third party site, for payment arrangement. On the other hand, the seller will be credited for goods sold (during the pickup process) if he uses the mediator as a clearinghouse, while a credit will be issued to the carrier for the shipping freights (during the delivery process) if he uses the mediator as a clearinghouse.

If the seller/carrier accept only direct payment from the buyer, rather than using the mediator as a clearinghouse, the mediator will not be responsible for collecting the payment from the buyer. However, the billing system will send an invoice to the buyer to make a direct payment to the seller/carrier. In an alternative embodiment, the mediator may rely on the seller/carrier to send such an invoice to the buyer. Typically this invoice includes the amount to be paid for (e.g. the purchased goods and/or the shipping freights), and the invoice payment deadline that was scheduled by the billing system. In an alternative embodiment, the mediator may only facilitate the payment transaction between the seller/carrier and the buyer by allowing both parties to communicate through his Web site M01. For example, the mediator will identify the buyer to the seller/carrier (and vice-versa) to permit both parties to complete the transaction. Alternatively, the mediator may facilitate the same by referring both parties to a third party intermediary acting as a clearinghouse for the transaction. The seller/carrier will need to confirm any payment made by the buyer, through the mediator's Web site M01. This way, the billing system will perform a test to validate whether or not the payment was completed as planned. FIG. 13B shows an example of a payment confirmation editor used in one embodiment of the present invention. If the buyer does not complete the payment before the invoice deadline, the billing system will cooperate with the customer billing system to underrate the buyer for the payment delay, and then the process will go forward. However, if the buyer does not pay the invoice (in full) before the scheduled payment deadline, he will be underrated and the entire transaction will be voided.

Once a payment is made by the buyer, the seller or carrier must confirm the exact date this payment was received. Then, the billing system will perform a test to validate whether or not the payment was completed as planned, e.g. before the scheduled invoice deadline. This way, the billing system will cooperate with the customer rating system to penalize the buyer for the delayed payment. Upon receiving a payment confirming from the seller/carrier, the billing system will record the payment, and any balance to be paid for will subsequently be notified to both the buyer. Since the seller/carrier directly collects payment from the buyer, no credit will be issued to him for the sale. However, the billing system will record the payment confirmed by the seller/carrier for tracking purposes. Subsequently, the seller/carrier will be charged a commission for the sale. Preferably the sale commission will be automatically generated by the billing system as a percentage of the transaction, e.g. the total amount of the purchase and/or the shipping freights.

If the seller/carrier uses the mediator as a clearinghouse, e.g. if the buyer only pays the mediator for the goods and/or the shipping charges, the billing system will compute the total amount of the purchase and/or the shipping freights, and then presents a consolidated invoice to be paid in a single transaction. While collecting payment from the buyer, any billing procedure may be. For example, the buyer can be prompted to pay by credit card, in which case the billing system will authorize and charge the buyer credit card. However, the billing system may also collect payment from the buyer using other alternative methods. For example, the billing system may provide the buyer with the information about a bank account to be credited using an ETF (Electronic Fund Transfer). Other payment methods may be used, including but not limited to, online payment service providers (such as PayPal), personal check, money order, etc. The billing system may also use the same payment methods to credit the seller/carrier's account. In alternative embodiment, a dedicated computer program (for example, a loyalty tracking software) may automatically credit the buyer for a future potential discount from a seller/carrier, if applicable. For example, if a buyer has a pending discount from a carrier, the billing software will automatically prompt such as discount to the buyer during the payment of the delivery freight to this specific carrier.

Once a full payment is made by the buyer, the billing system will perform a test to validate whether or not the payment was completed as planned, e.g. before the scheduled invoice deadline. This way, the billing system will cooperate with the customer rating system to penalize the buyer for a potential delay of payment.

Furthermore, the mediator will credit the seller for the good sold. Preferably, the credit will be issued to the seller of goods after the pickup confirmation. If the seller handles the sipping of orders placed with him, he will be credited for the goods sold and the shipping freights associated to delivering the package to the buyer, since he will be responsible for shipping any order placed with him. However, if the seller relinquishes his shipping operations to independent carriers, he will only be credited for the goods sold, while the selected carrier will be credited with shipping freights for delivering the package to the buyer. Preferably, the carrier will be credited after the package delivery confirmation. Subsequently, the seller/carrier will be charged a commission for the sale. Preferably the sale commission will be automatically generated by the billing system as a percentage of the transaction, e.g. the total amount of the purchase and/or the shipping freights.

Finally, a fund transfer will be issued to the seller/carrier's bank account for any credit accumulated, on a periodic basis (such as every month).

12. Customer Rating Function

Figure 14A:
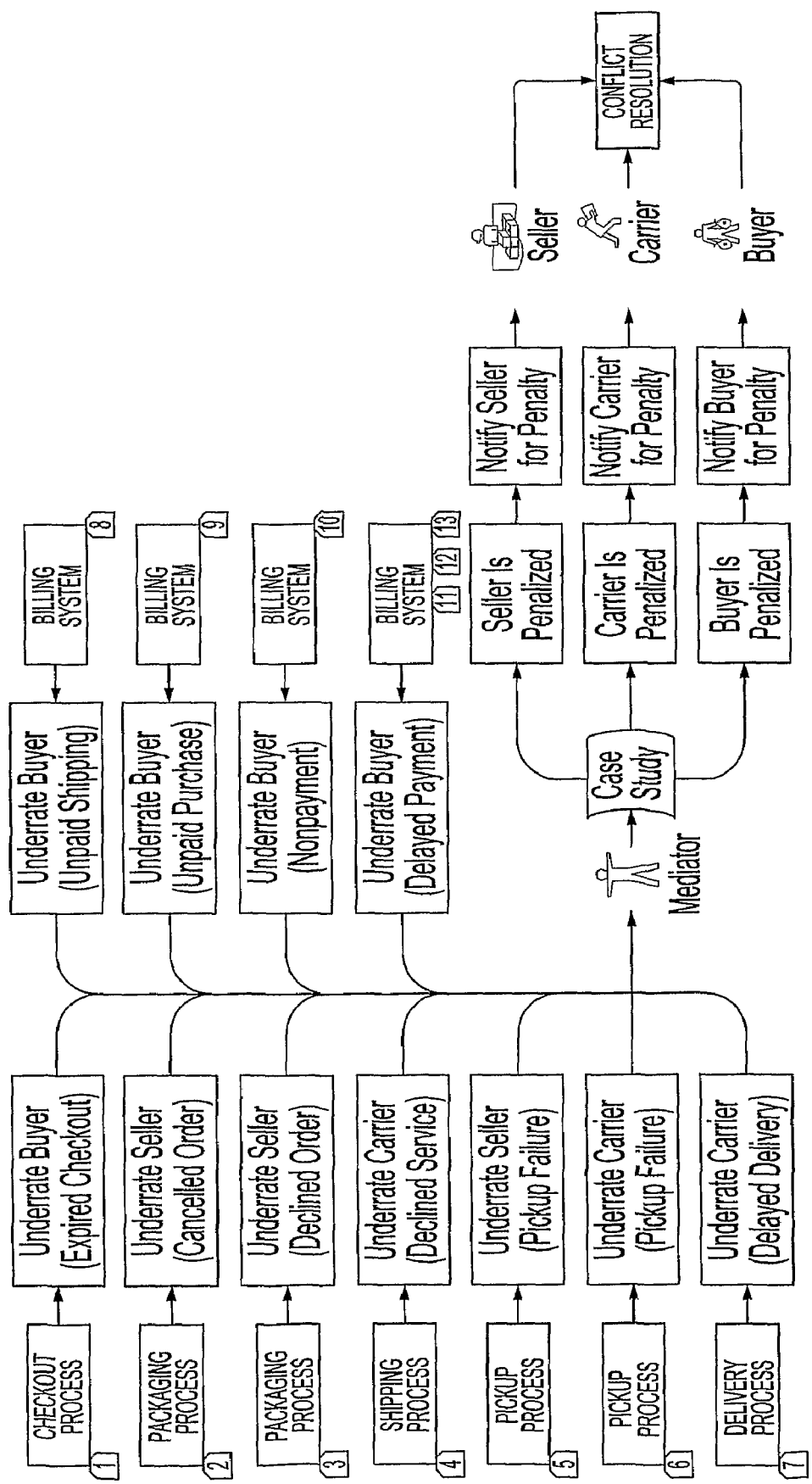
FIG. 14A is a flowchart illustrating the customer rating process used in one embodiment of the present invention.

The mediator's Web site M01 also includes a customer rating system that automatically monitors all transactions occurring on the site. This rating system, also referred to herein as ARTS (Automatically Rated Transaction System), aimed to ensure that each party actually delivers on what it has promised to other. The customer rating system is implemented by a computer program M03, referred to herein as the customer rating software that runs on the mediator's Web site M01. The customer rating system will now be described with reference to FIG. 14A, which is a flowchart illustrating the customer rating process, as implemented in one embodiment of the present invention.

With reference to FIG. 14 A, the customer rating system is accessed via several modules, which include the checkout, packaging, shipping, pickup, delivery, and billing. When, triggered, the customer rating system will atomically generate a rating score for each user, e.g. seller, buyer, and carrier, based on the conclusion of the transactions they may be involved in. For example, the customer rating system will underrate the buyer for any expired shopping cart (checkout process), and for a delayed payment or nonpayment (billing process). On the other hand, the customer rating system will underrate the seller for any cancelled, declined or delayed order (packaging process), or as the negligent party after a pickup failure (pickup process). Finally, the customer rating system will underrate the carrier for any declined delivery request (shipping process), as the negligent party after a pickup failure (pickup process), or for any delayed delivery (delivery process). Any other rating criteria may be used to generate the user record. For example, if a user conduct fraudulent activities, he will either be underrated or his account will be deactivated, dependant of the severity of the fraud of concern. In all cases, the customer rating system associates a score to each type of penalty. Hence, each time a user is penalized, the customer rating system will summarize his penalties. Then, the customer rating system will compute a rating score based on these penalties.

On benefit of such a rating system is that it automatically generate (e.g. without a human interaction) any feedback record, conversely to other rating systems used in electronic commerce that are human-generated. Hence, the automated transactions rating score, generated by the customer rating system, may be used by the mediator to help its online community, including visiting prospects, to accurately learn about other users' trading history on the mediator's Web site M01. The customer rating system may for example, provide impartial rating of any trading behavior of parties involved in transactions throughout the mediator's Web site M01. In other words, this rating system will generate and create a rating record for each user in the customer database M05, based on any transaction interactions they have been involved in on the mediator's Web site M01. More specifically, the customer rating system evaluates the user performance based on the conclusion specifics transactions, which will result to the creation of an entry record in the customer database M05. Hence, this rating system will provide immediate help to any user visiting the mediator's Web site M01 by providing then which a complete trading history about others. For example, the customer rating system will generate a record about the buyer payment habit (quick, late, nonpayment, etc.). The customer rating system will also general a seller packaging record, which may include the number of completed/declined orders, the average score of goods availability. The customer rating system will also create a carrier shipping/delivery record, which may include the number of services requests declined, and the total packages delivered/declined. The customer rating system may also compute the total number of claims filed/received by a user. FIG. 14B illustrates an example of a screen display of a potential record generated by the customer rating system, as implemented in one embodiment of the present invention. Although the rating criteria are extended, only overall rating record will be usually shown. However, a more informative details will be provided about any used by browsing the targeted customer rating record.

13. Glossary of Terms and Acronyms

The following terms and acronyms are used throughout the detailed description of the present invention.

Internet. A collection of public and/or private networks, that are linked together by a set of standard protocols (such as TCP/IP and HTTP) to form a global, distributed network. While this term is intended to referrer to what is now commonly known as the Internet, it is also intended to encompass variations which may be made in the future, including changes and additions to existing standard protocols.

World Wide Web (also known as the "Web"). Used herein to refer generally to both (i) a distributed collection of interlinked, user-viewable hypertext documents (commonly referred to as Web documents or Web pages) that are accessible via the Internet, and (ii) the client and server software which provide user access to such documents using standardized Internet protocols, such as HTTP and FTP. However "Web" and "World Wide Web" are intended to encompass future markup languages and transport protocols which may be used in place of (or in addition to) HTML, XML and HTTP.

HTTP (HyperText Transport Protocol). The standard World Wide Web client-server protocol used for the exchange of information (such as HTML or XML documents, and client requests of such documents) between a browser and a Web server.

Web Site. A computer system that serves informal content over a network using the standard protocols of the World Wide Web. Typically, a Web site corresponds to a particular Internet domain name, such as mediator, and includes the content associated with a particular organization. Has used herein, the term is generally intended to encompass both (i) the hardware/software server components that serve the informal content over the network, and (ii) the "back end" hardware/software components, including any non-standard components to perform services for Web site users.

URL (Uniform Resource Locator). A unique address which fully specifies the location of a file or other resource on the Internet. The general format of a URL is: "protocol://hostname:port/path/resource", where the port specification is optional, and if none is entered by the user, the browser defaults to the standard port of whatever service is specified as the protocol (for example, 80 as default port for HTTP, and 21 for FTP).

HTML (HyperText Markup Language). A standard coding convention and set of codes for attaching presentation and linking attributes to informal content within documents. HTML documents are normally served by the Web server. But some client-based scripts languages (such as JavaScript, etc.) can generate dynamic HTML documents viewable by most Web browsers. HTML tags can be used to create links (commonly referred to as "hyperlinks") to other Web documents and resources.

XML (eXtended Markup Language). A widely used standard from the World Wide Web Consortium (W3C) that facilitates the interchange of data between computer applications. XML is a subset of SGML constituting a particular text markup language for interchange of structured data. XML is similar to the HyperText Markup Language (HTML), in that both use markup codes (tags), but unlike HTML, XML is not limited to Web documents. Computer programs can automatically extract data from an XML document, using its associated DTD as a guide. Anyone can create their own markup vocabulary (called an XML Schema), and XML ensures that the structure will be intelligible to anyone else who consults the XML Schema document. More importantly, referring to an XML Schema enables XML-aware software to automatically manipulate the data without needing advance knowledge of the structure. XML is a trademark of the World Wide Web Consortium (W3C).

Client-Server. A model of interaction in a networking system (interlinked computers) in which one computer send a request to another computer's program and waits for a response. The requesting program is called the "client", and the program which responds to the request is called the "server". In the context of the Internet (World Wide Web), the client is the "Web browser" that runs on a computer of a user, and the program which responds to the browser requests by serving Web pages and others documents is commonly called the "Web server".

Servlet. Java Servlet technology provides web developers with a simple, consistent mechanism for extending the functionality of a web server and for accessing existing business systems. A Servlet can almost be thought of as an applet that runs on the server side—without a face. Java Servlets have made many web applications possible. Servlets is the Java alternative of CGI (Common Gateway Interface). Servlets are programs that run on a Web server. They can requested by any client program (that runs on a computer of a user or another Web Server) using TCP/IP protocols. Servlets responses are typically generated Web pages or any Java Serialized Objects. Servlets are the Java platform technology of choice for extending and enhancing web servers. Servlets provide a component-based, platform-independent method for building web-based applications, without the performance limitations of CGI programs. And unlike proprietary server extension mechanisms (such as the Netscape Server API or Apache modules), Servlets are server- and platform-independent. This leaves you free to select a "best of breed" strategy for your servers, platforms, and tools While the invention has been described herein with reference to certain preferred embodiments, these embodiments have been presented by way of example only, and not to limit the scope of the invention. Accordingly, the scope of the invention should be also defined in accordance with the claims (not included).

The invention claimed is:

1. A computer program product for providing a system for selling shipping services online, the system comprising:
   a data recording medium;
   a product selector encoded on said data recording medium for selecting, by a buyer, a product to be purchased, said product being offered for sale by a seller;
   a shipping service information collector encoded on said data recording medium for obtaining information about said shipping services from carriers;
   a shipping parameter collector encoded on said data recording medium for obtaining information to specify shipping parameters in connection with said product to be purchased, said information for specifying said parameters being provided by at least one of said buyer and said seller;
   a shipping option computing module encoded on said data recording medium and connected to said shipping service information collector and to said shipping parameter collector for computing available shipping services;
   a shipping service selector encoded on said data recording medium and connected to said shipping option computing module for selecting, by said buyer, a shipping service in connection with a given carrier among said available shipping services;
   a shipping service notifying module encoded on said data recording medium and connected to said shipping service selector for generating a shipping service request and transmitting said request to said given carrier; and
   a transaction concluding module encoded on said data recording medium for receiving from said carrier a response to said request and transmitting said response to said buyer.

2. A computer program product as claimed in claim 1, wherein said shipping parameter collector comprises a user interface for acquiring said information to specify said shipping parameters for said product to be purchased.

3. A computer program product as claimed in claim 2, wherein said user interface consists of an html document.

4. A product as claimed in claim 3, wherein said user interface consists of an XML document.

5. A product as claimed in claim 3, wherein said user interface consists of an applet.

6. A product as claimed in any one of claims 1 to 5, wherein said shipping service information collector consists of one of an applet, an html document and an XML document.

7. A product as claimed in any one of claims 1 to 5, wherein said shipping service selector consists of an applet.

8. A product as claimed in any one of claims 1 to 5, wherein said shipping service notifying module is adapted to be connectable to Internet and said transmitting said request is carried out by email.

9. A product as claimed in any one of claims 1 to 5, wherein said shipping service notifying module is adapted to be connectable to Internet and said transmitting said request is carried out by an http request.

10. A product as claimed in any one of claims 1 to 5, wherein said shipping service notifying module is adapted to be connectable to Internet and said transmitting said request is carried out by an XML document.

11. A product as claimed in claim 8, wherein said transaction concluding module is adapted to be connectable to Internet and said receiving and transmitting said response is carried out by email.

12. A product as claimed in claim 1, further comprising a rating module recorded on said data recording module for monitoring all transactions between trading partners, rating users based on their activities, and generating a member profile for each participant.

13. A product as claimed in claim 6, wherein said shipping service selector consists of an applet.

14. A product as claimed in claim 6, wherein said shipping service notifying module is adapted to be connectable to Internet and said transmitting said request is carried out by email.

15. A product as claimed in claim 7, wherein said shipping service notifying module is adapted to be connectable to Internet and said transmitting said request is carried out by email.

16. A product as claimed in claim 6, wherein said shipping service notifying module is adapted to be connectable to Internet and said transmitting said request is carried out by an http request.

17. A product as claimed in claim 7, wherein said shipping service notifying module is adapted to be connectable to Internet and said transmitting said request is carried out by an http request.

18. A product as claimed in claim 6, wherein said shipping service notifying module is adapted to be connectable to Internet and said transmitting said request is carried out by an XML document.

19. A product as claimed in claim 7, wherein said shipping service notifying module is adapted to be connectable to Internet and said transmitting said request is carried out by an XML document.

20. A product as claimed in claim 9, wherein said transaction concluding module is adapted to be connectable to Internet and said receiving and transmitting said response is carried out by email.

21. A product as claimed in claim 10, wherein said transaction concluding module is adapted to be connectable to Internet and said receiving and transmitting said response is carried out by email.

* * * * *